United States Patent [19]
Anderson et al.

[11] Patent Number: 6,061,108
[45] Date of Patent: May 9, 2000

[54] BROADBAND CHOLESTERIC POLARIZER AND AN OPTICAL DEVICE EMPLOYING THE SAME

[75] Inventors: Duncan James Anderson, Abingdon; Gillian Margaret Davis, Huntingdon; Kathryn Walsh, Mansfield; Robert George Watling Brown, Thame, all of United Kingdom; Masayuki Nakazawa, Tsukuba, Japan

[73] Assignee: Sharp Kabushiki Kaisha, Osaka, Japan

[21] Appl. No.: 09/010,442

[22] Filed: Jan. 22, 1998

[30] Foreign Application Priority Data

Jan. 24, 1997 [GB] United Kingdom .................. 9701472
Jan. 31, 1997 [GB] United Kingdom .................. 9702078

[51] Int. Cl.$^7$ ................................................. G02F 1/1335
[52] U.S. Cl. ............................ 349/98; 349/115; 359/499; 359/498
[58] Field of Search ...................... 349/115, 98; 359/494, 359/499, 498

[56] References Cited

U.S. PATENT DOCUMENTS

| 4,073,571 | 2/1978 | Grinberg et al. ........................ 350/337 |
| 5,518,783 | 5/1996 | Kawata et al. ............................. 428/1 |
| 5,731,886 | 3/1998 | Taber et al. ............................... 359/65 |

FOREIGN PATENT DOCUMENTS

| 0524028 | 1/1993 | European Pat. Off. . |
| 0531120 | 3/1993 | European Pat. Off. . |
| 0606939 | 7/1994 | European Pat. Off. . |
| 0606940 | 7/1994 | European Pat. Off. . |
| 0634674 | 1/1995 | European Pat. Off. . |
| 0720041 | 7/1996 | European Pat. Off. . |
| 9533224 | 12/1995 | WIPO . |
| 9602016 | 1/1996 | WIPO . |
| 9610774 | 4/1996 | WIPO . |
| 9719385 | 5/1997 | WIPO . |

OTHER PUBLICATIONS

Search Report for Application No. 98300476.3–2205–; Dated Aug. 27, 1998 (EPO).

H.L. Ong, Japan Display '92, pp. 247–250, 1992, "New Normally White Negative Birefringence Film Compensated Twisted Nematic LCD's with Largest Viewing Angle Performance".

S. –T. Wu, Sid 95 Digest, pp. 555–558, 1995, "Phase--Matched Biaxial Compensation Film for LCDs".

S. Nishimura et al., Sid 95 Digest, pp. 567–570, 1995, "The Performance of a Liquid–Crystal Polymer Film as an Optical Compensator for a Fast–Response STN–LCD".

J. –C. Yoo et al., Conference Record of the 1994 International Display Research Conference and International Workshops on Active–Matrix LCDs & Display Materials, pp. 217–219, 1994, Novel Compensator with Grating Structure for Twisted Nematic . . . .

V. A. Belyakov et al., Sov. Phys. USP., vol. 22, No. 2, pp. 63–88, 1979, "Optics of Cholesteric Liquid Crystals".

G. Joly et al., J. Optics, vol. 25, No. 5, pp. 177–186, 1994, "Optical Properties of the Interface Between a Twisted Liquid Crystal and an Isotropic Transparent Medium".

L.E. Hajdo et al., J. Opt. Soc. Am., vol. 69, No. 7, pp. 1017–1023, 1979, "Theory of Light Reflection by Cholesteric Liquid Crystals Possessing a Pitch Gradient".

*Primary Examiner*—William L. Sikes
*Assistant Examiner*—James A. Dudek
*Attorney, Agent, or Firm*—Renner, Otto, Boisselle & Sklar

[57] ABSTRACT

A broadband cholesteric polariser includes at least one pair of adjacent layers. The at least one pair includes a cholesteric layer and a compensating layer. The compensating layer has a refractive index perpendicular to the compensating layer greater than a refractive index oriented within the compensating layer.

11 Claims, 22 Drawing Sheets

$$n(av) \sim \frac{n(e) + n(o)}{2}$$

BROADBAND CHOLESTERIC POLARIZER AND AN OPTICAL DEVICE EMPLOYING THE SAME

The present invention relates to an optical device. The present invention also relates to a broadband cholesteric polariser which may, for example, be used in display backlights and in liquid crystal displays, such as super twisted nematic liquid crystal displays.

EP 0 720 041 discloses an application of patterned cholesteric color filters and polarisers requiring well-defined angular spectral properties. Such a polariser may consist of layers each reflecting a defined spectral band. No fabrication details are given for the polariser although it is suggested that the layers may be distinct or non-distinct depending on the fabrication process. There is no discussion of the angular properties of such a broadband polariser.

EP 0 720 041 also suggests that the cholesteric color filters may consist of a layered structure where each layer reflects a given wavelength band. The reflected wavelengths are dependent on the distance from the surface of the filter. It is suggested that the fabrication technique might involve using a thermochromic material and varying the temperature while illuminating with UV light to fix the material. Such a technique would give a color filter in which the layers are not distinct. Alternatively it is suggested that the layers may be fabricated in such a way that they are more distinct. However, no details are given.

EP 0 634 674 discloses a wide spectral and angular bandwidth rear polariser for direct view displays. The broadband polariser is made using high birefringence cholesteric materials or by using stacks of lower birefringence cholesteric films.

EP 0 606 940 discloses a broadband cholesteric polariser which is made using a combination of ultraviolet (UV) intensity profile and diffusion to expand the polariser bandwidth. The intensity profile results from using a polymerising wavelength in a range where the maximum of the sum of the absorptions of the cholesteric material and the photoinitiator exists. Alternatively, an appropriate UV absorbing dye is added to the cholesteric mixture. The polariser comprises a graded pitch structure which varies monotonically from one surface of the polariser to the other.

W095/33224 discloses a display devise including a reflecting polariser in the form of a cholesteric filter. The cholesteric filter comprises a simple layer of liquid crystalline polymer having a helical pitch which varies between upper and lower limits to achieve a broadband performance.

"Optics of cholesteric liquid crystals", V. A. Belyakov et al, Sov. Phys. Usp. 22(2), pp 63–88 February 1979 and "Optical properties of the interface between a twisted liquid crystal and an isotropic transparent medium" G. Joly et al, J Optics, vol 25 pp 177–186 (1994) disclose that, for a single pitch cholesteric film, the polarisation state of reflected and transmitted light has a complex dependence on wavelength and angle of illumination. For graded pitch cholesteric films providing wider reflection bandwidths, the angular dependence is more complex but has not been studied. "Theory of light reflection by cholesteric liquid crystals possessing a pitch gradient" L. E. Hajdo et al, J. Opt. Soc. Am. vol 69, mo7 July 1979 considers only normal incidence.

W096102016 discloses a backlight illumination system for a liquid crystal device (LCD) comprising a broadband cholesteric polariser. This patent discloses that improved off-axis performance may be achieved by orienting the CLCP polariser such that the largest pitch is closest to the illumination source. Also, a negative birefringence quarter wave film may be used to provide a further improvement to the off-axis performance as well as to convert light to a linearly polarised state.

It is known to use compensators in LCDs in order to reduce or eliminate the unwanted effects of birefringence. Various types of compensators for dealing with specific LCD birefringence problems have been disclosed. For instance, a negative birefringence film whose optic axis is normal to the film plane is disclosed in Japan Display '92 pp 247–250 for improving the viewing angle of a normally white mode twisted nematic LCD. Also, angular compensation for a normally white mode twisted nematic or super twisted nematic LCD using a short pitch cholesteric liquid crystal polymer film such that the intra-plane refractive index is substantially averaged and larger than the refractive index in the thickness direction is disclosed in LP 0 531 120. The compensation film essentially has a negative uniaxial structure whose optic axis is normal to the plane of the film. Multilayer films and holographically formed grating structures have also been used as negative birefringence compensators for normally white mode twisted nematic LCDs. SID '95, P47, pp 555–558, S. T. Wu discloses the use of biaxial compensators to improve the contrast ratio both on-axis and off-axis.

SID '95, P50 Nishimura "Color compensation" discloses the use of a liquid crystal polymer film with a super twisted nematic structure and controllable retardation, twist angle and dispersion for improving the contrast ratio of super twisted nematic LCDs over the visible spectrum at normal incidence.

According to a first aspect of the invention, there is provided a broadband cholesteric polariser characterised by comprising at least one pair of adjacent layers, the or each pair comprising a cholesteric layer and a compensating layer having a refractive index perpendicular to compensating layer greater than a refractive index oriented within the compensating layer.

Such an arrangement provides a broadband polariser of improved off-axis performance. The layers may be arranged so as to achieve improved polariser characteristics at large off-axis angles of incidence of light. However, the properties of the layers may be selected to provide desired off-axis performances which are not simply reduced dependence of performance on the angle of passage of light through the polariser. Other such performances may be required when such polarisers are used within liquid crystal displays.

The at least one pair of adjacent layers may comprise a plurality of pairs of adjacent layers and each of the cholesteric layers may have an average pitch which is different from the average pitch of the or each other cholesteric layer. Such a multi-layer structure allows the effective bandwidth of the polariser to be increased.

Preferably the cholesteric layers alternate with the compensating layers.

Each of the cholesteric layers may have a substantially constant pitch. The pitches of the cholesteric layers preferably increase monotonically from a first surface to a second surface of the polariser.

In another embodiment, the cholesteric layers may have a graded pitch. The average pitches of the cholesteric layers preferably increase monotonically from a first surface to a second surface of the polariser.

The layers may be formed in a single film of cholesteric material. The or each compensating layer may be in a non-cholesteric state, for instance a homeotropic state.

According to a second aspect of the invention, there is provided a light source comprising at least one light emitter characterised by a polariser in accordance with the first aspect of the invention for polarising light from the or each light emitter.

It is thus possible to provide a more efficient light source because of the improved properties of the polariser. Such a light source may be arranged to have increased brightness, reduced power consumption or a combination of the two. In the case of a battery-powered light source, increased battery life and/or reduced battery size and weight may be achieved.

According to a third aspect of the invention, there is provided an optical device comprising a light source and a cholesteric polariser comprising a layer of graded pitch cholesteric material whose pitch increases monotonically from a first surface to a second surface thereof, characterised in that the first surface is disposed so as to receive light from the light source.

It has been found that, contrary to the teaching of WO 96/02016, graded pitch polarises have advantageous properties when used with the shorter pitch surface facing a source of light. In particular, as described hereinafter, the off-axis performance is improved. The polarisation function of the graded pitch cholesteric material is better at high off-axis angles than when such a layer is used with the longer surface pitch towards the light source. For instance, it is possible to provide backlights, for instance for displays, of improved efficiency. Such backlights may be used to increase the display brightness. Alternatively, to achieve brightness, light source power requirements may be reduced so that, in the case of battery-powered equipment, smaller and lighter batteries may be used. Alternatively, for a given size of battery and a given light intensity, battery life maybe increased.

The invention will be further described, by way of example, with reference to the accompanying drawings in which.

Figure 3A:
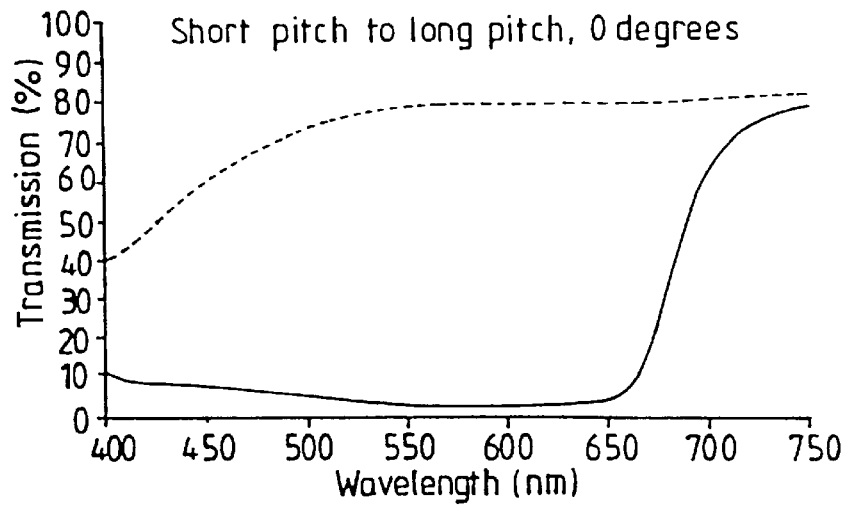
FIGS. 3a to 3c are graphs of transmission in percent against wavelength in nanometres of a broadband cholesteric polariser for different angles of incidence with light of difference circular polarisation states incident upon a short pitch side.
Figure 3B:
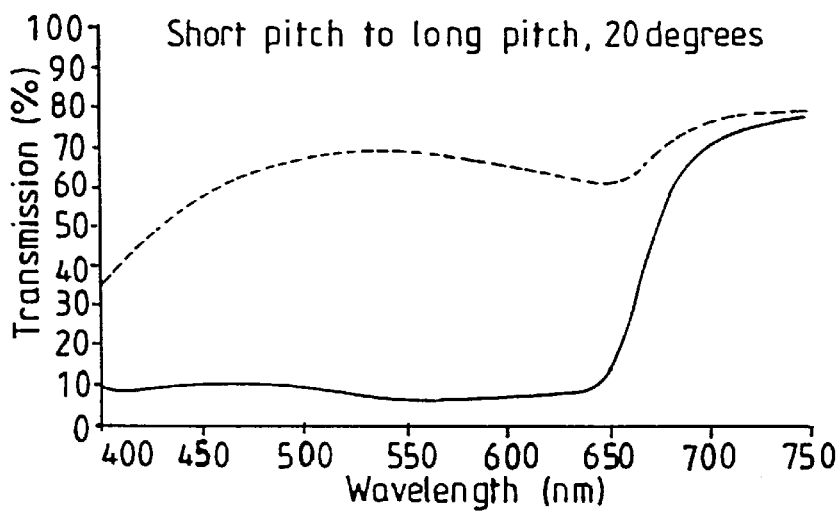
Figure 3C:
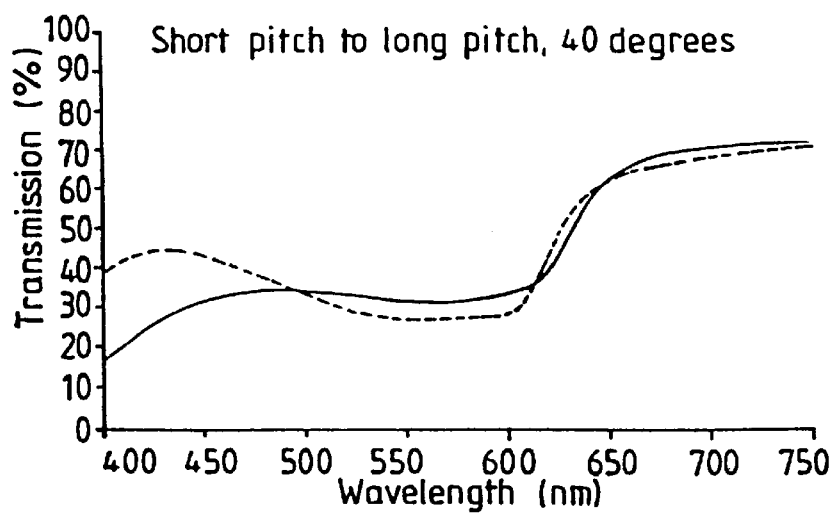
Figure 8A:
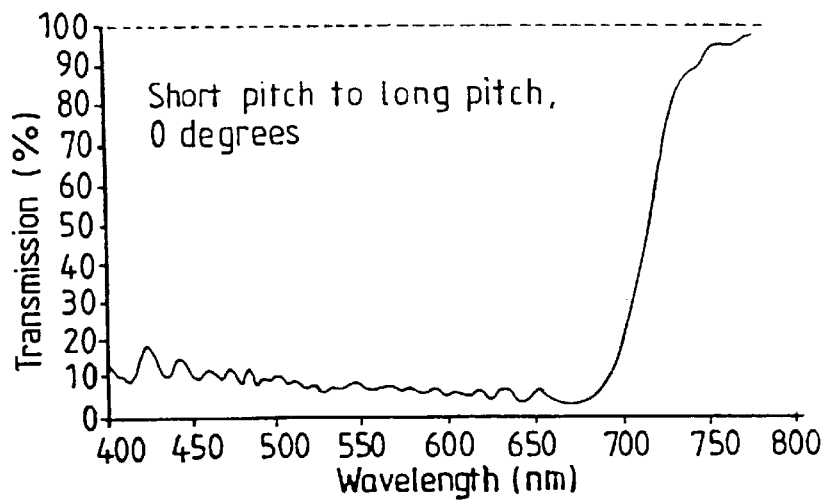
Figure 8B:
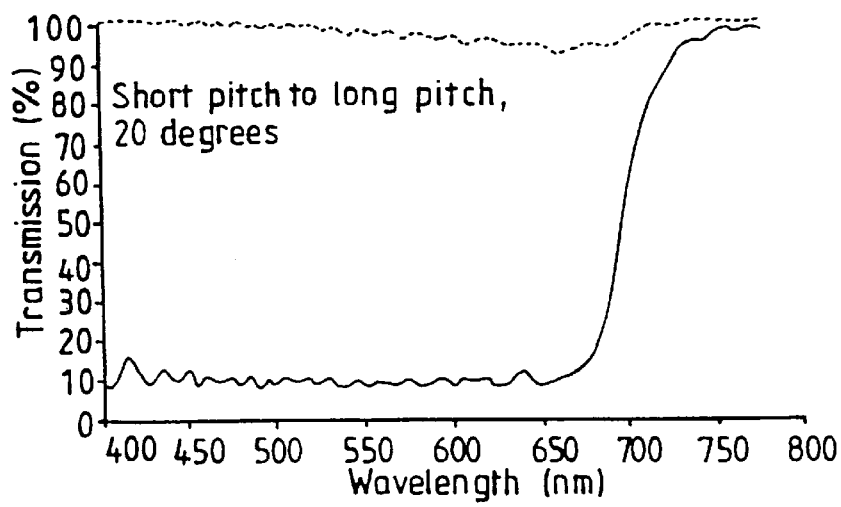
Figure 8C:
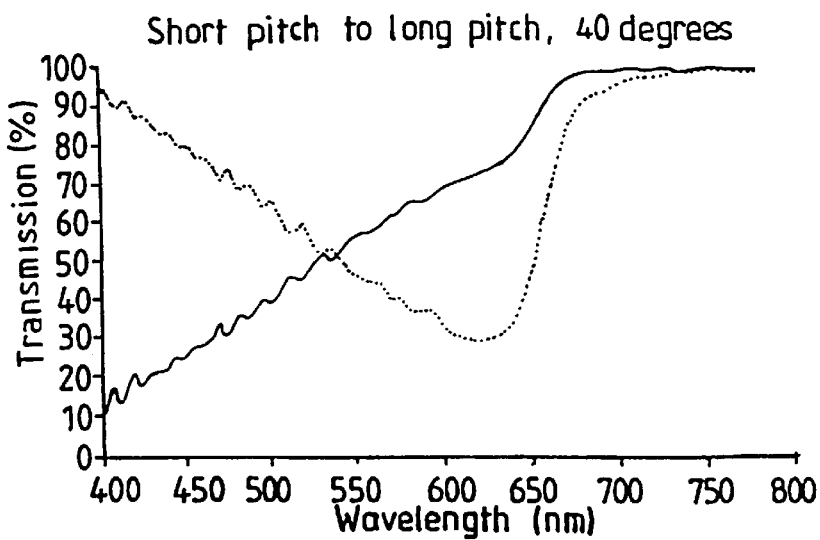
Figure 9A:
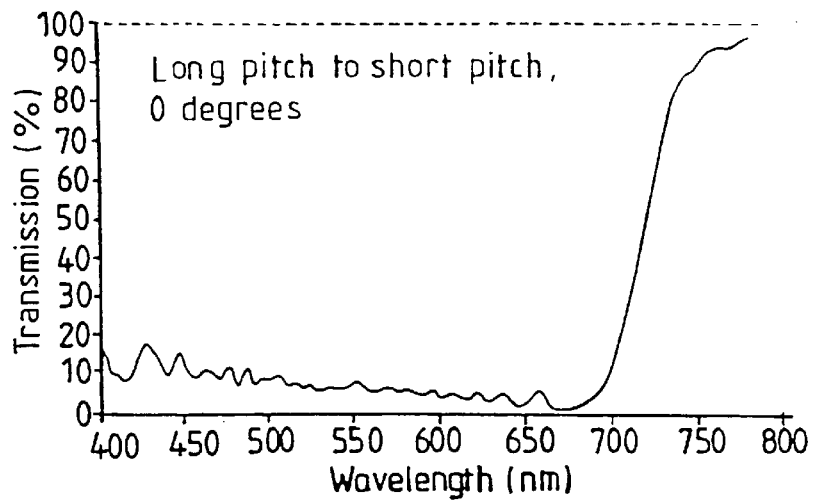
Figure 9B:
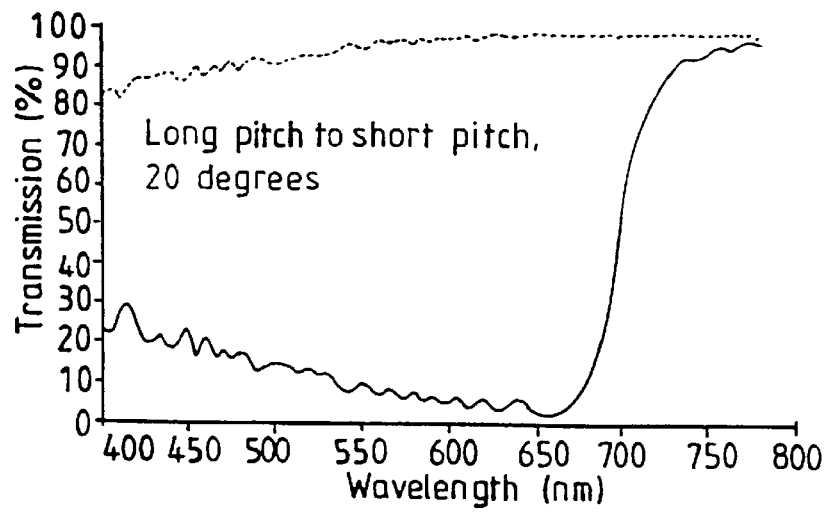
Figure 9C:
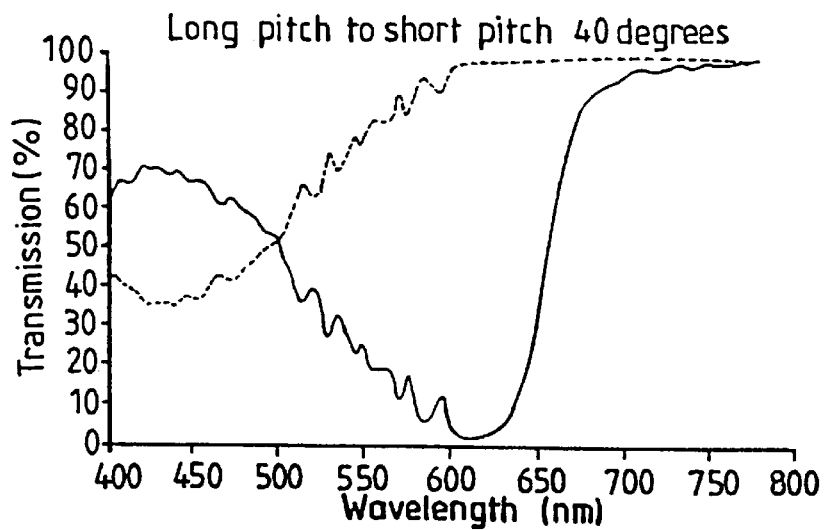
Figure 10A:
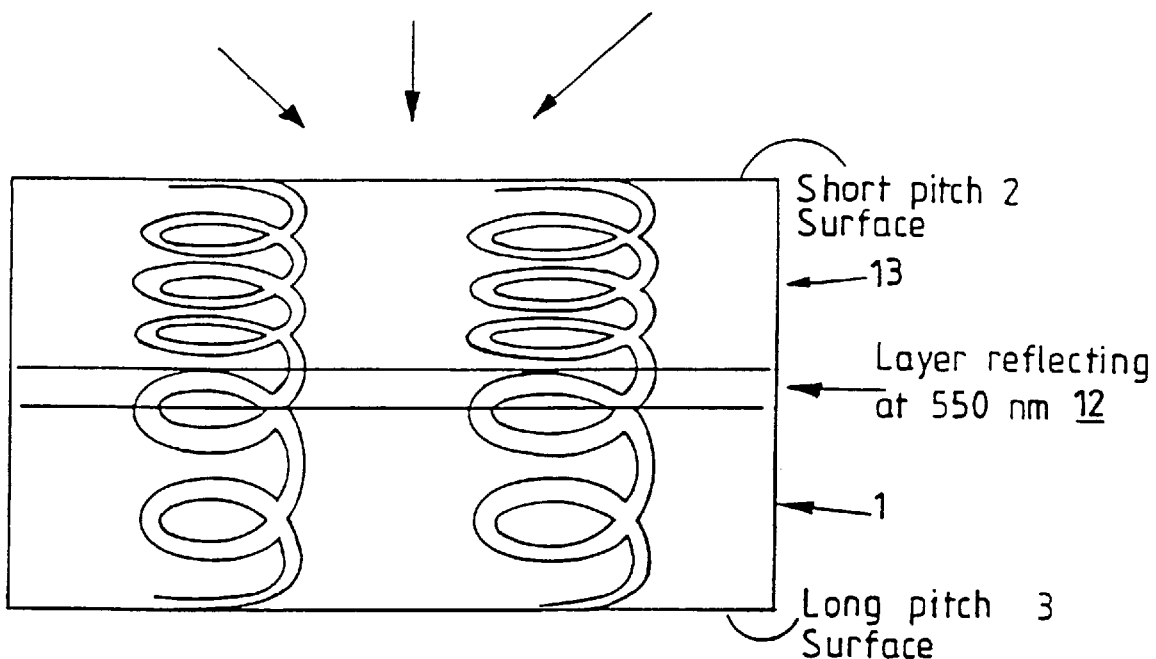
Figure 10B:
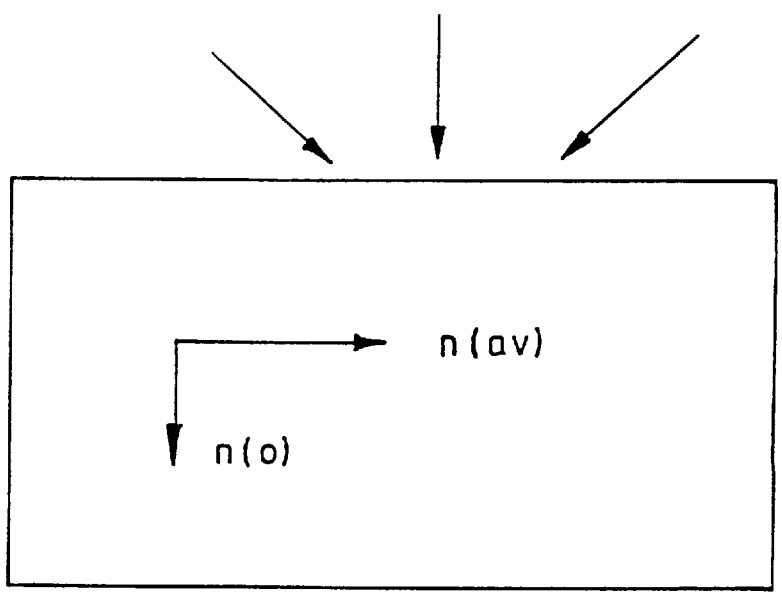
Figure 11A:
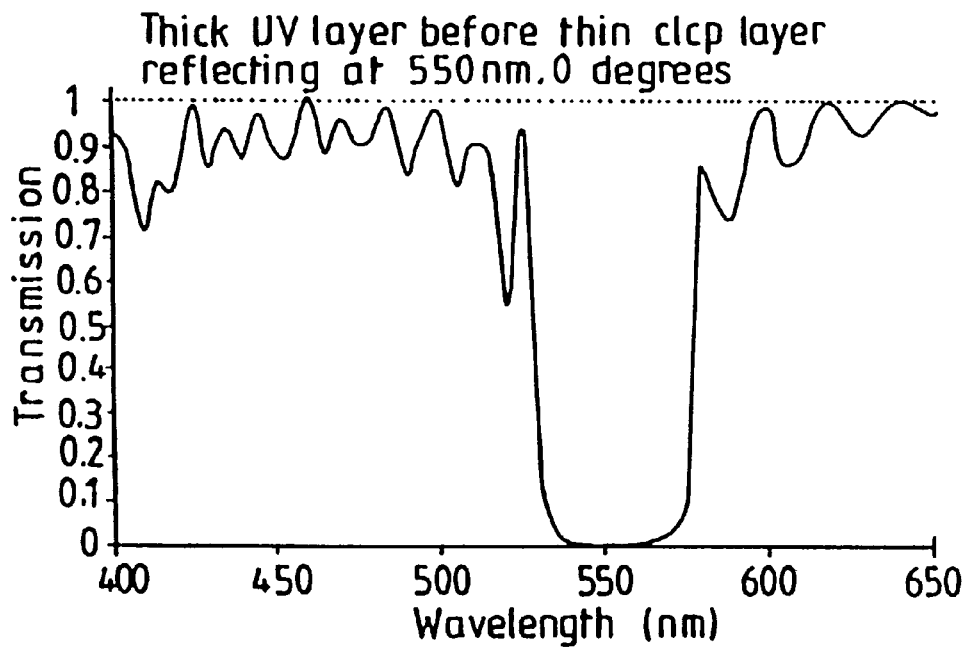
Figure 11B:
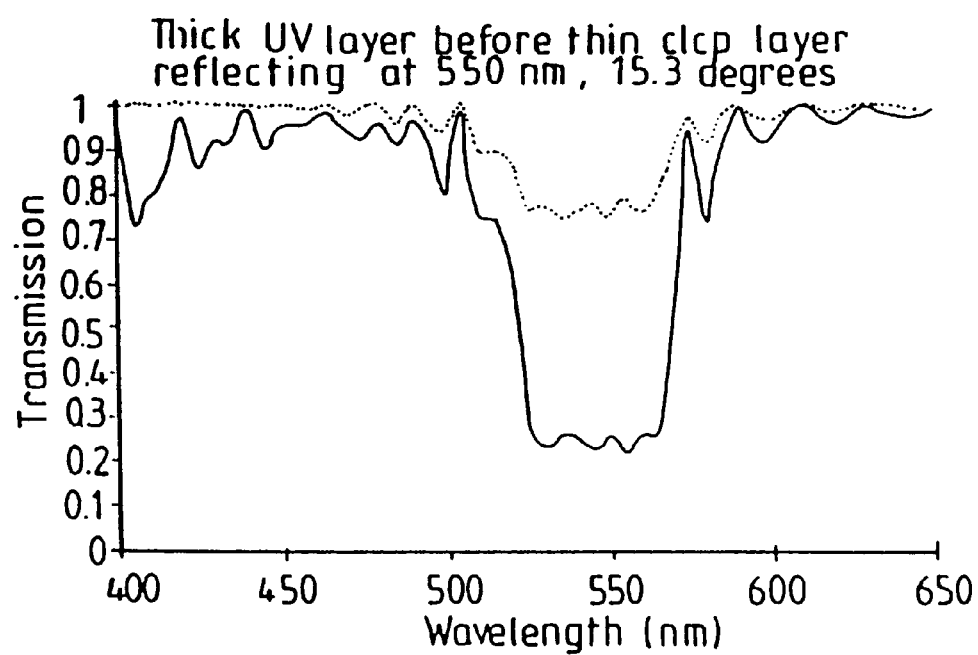
Figure 11C:
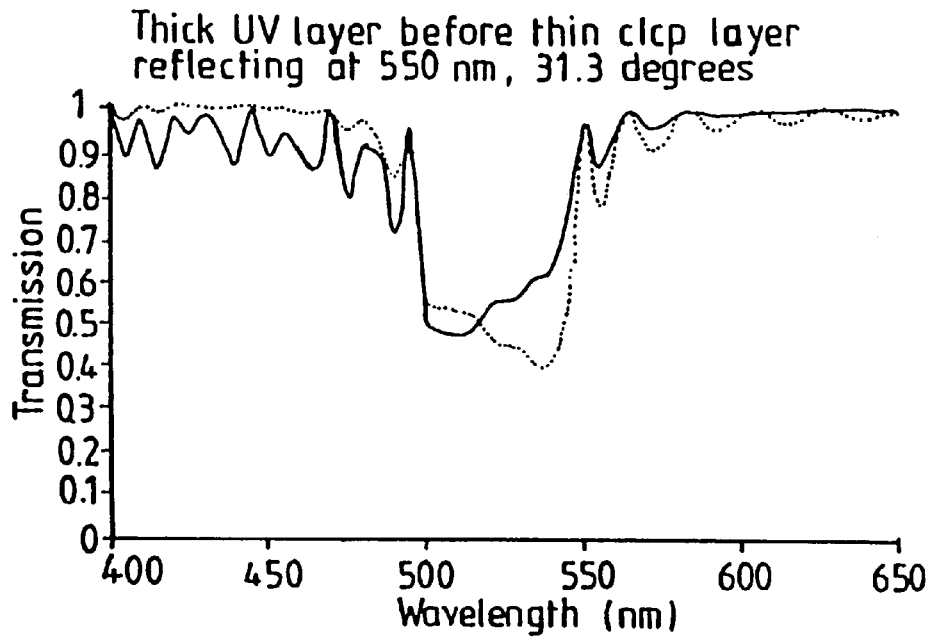
Figure 11D:
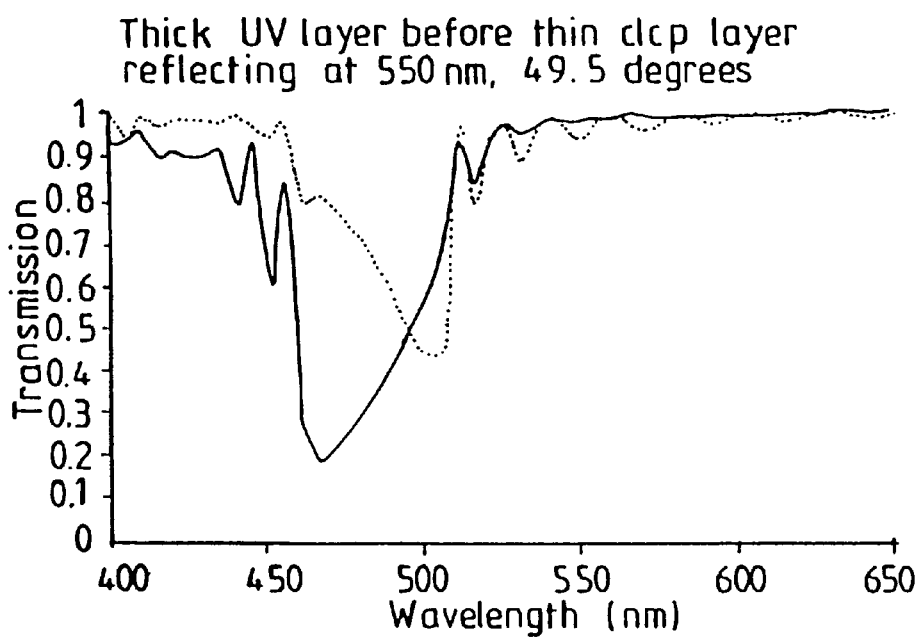
Figure 12A:
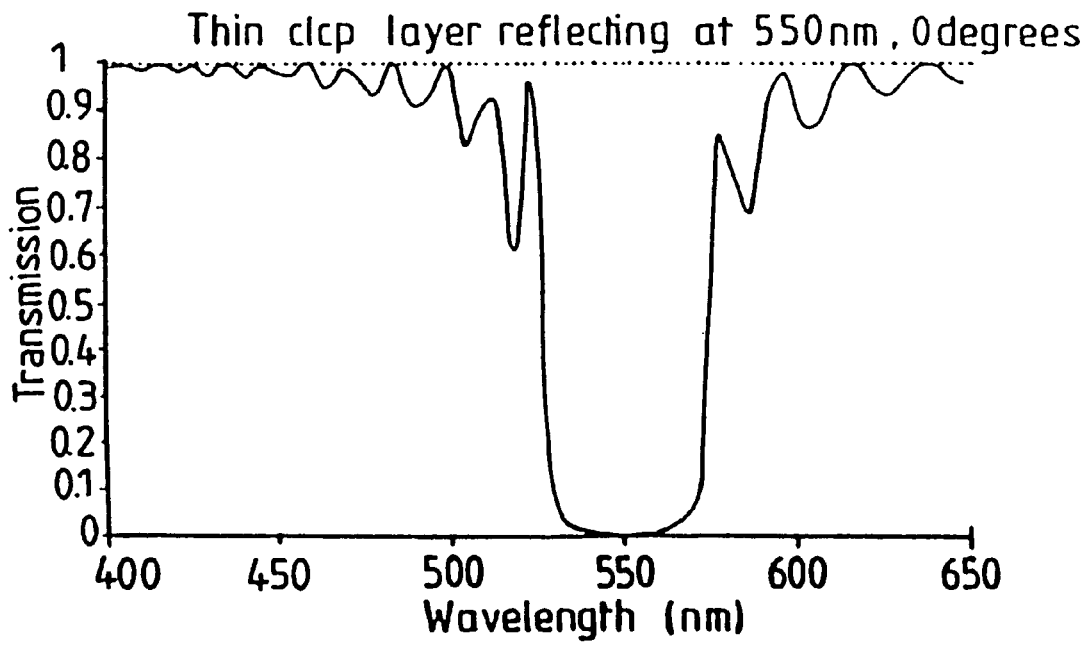
Figure 12B:
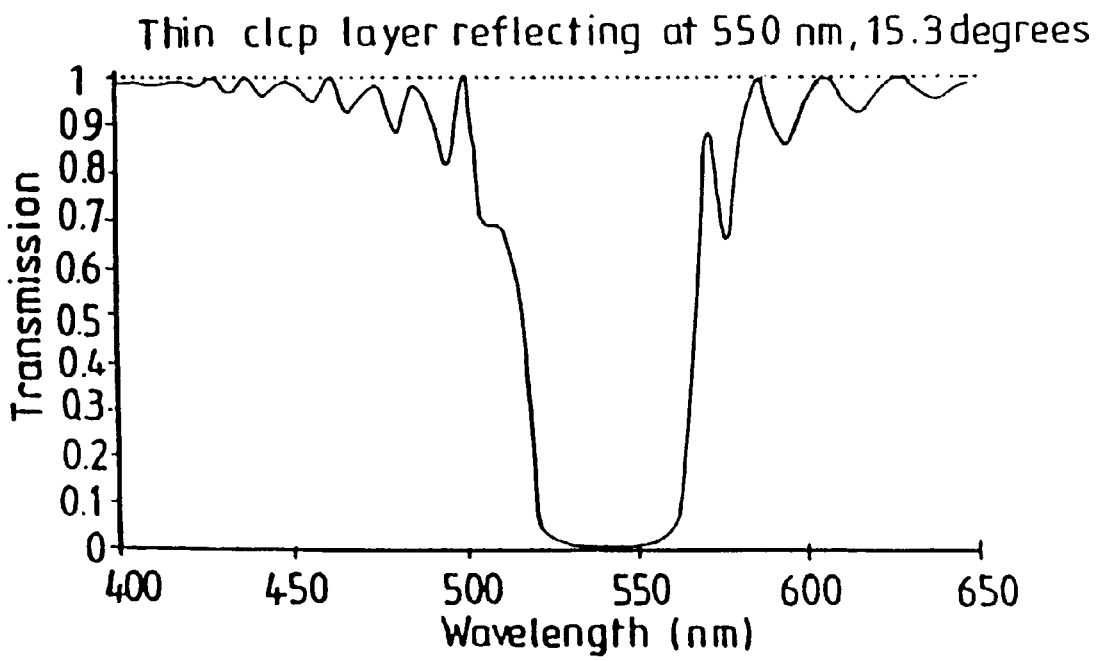
Figure 12C:
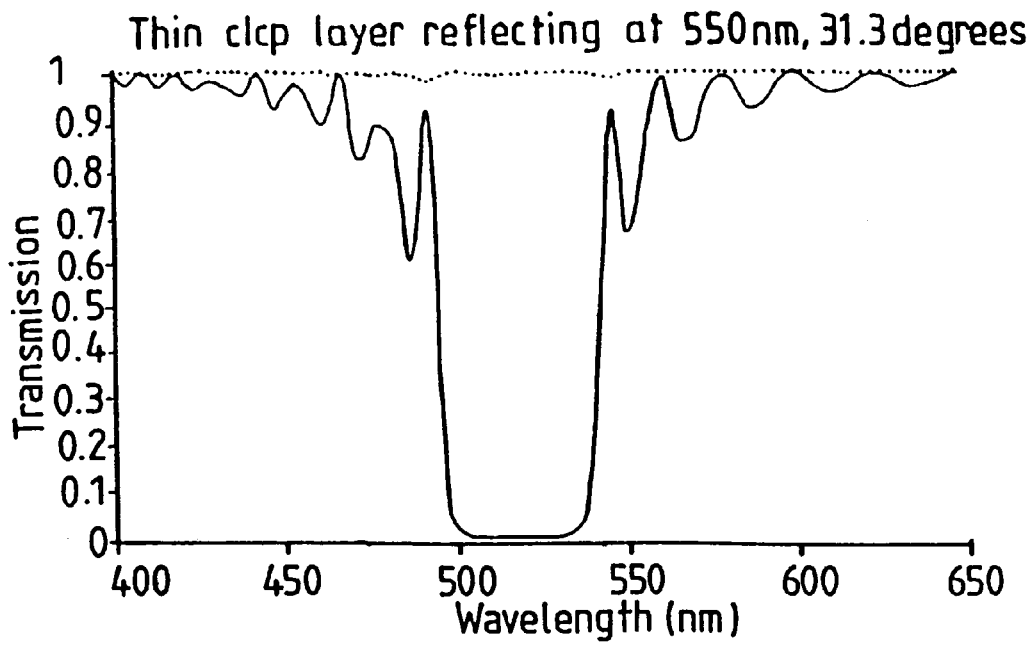
Figure 12D:
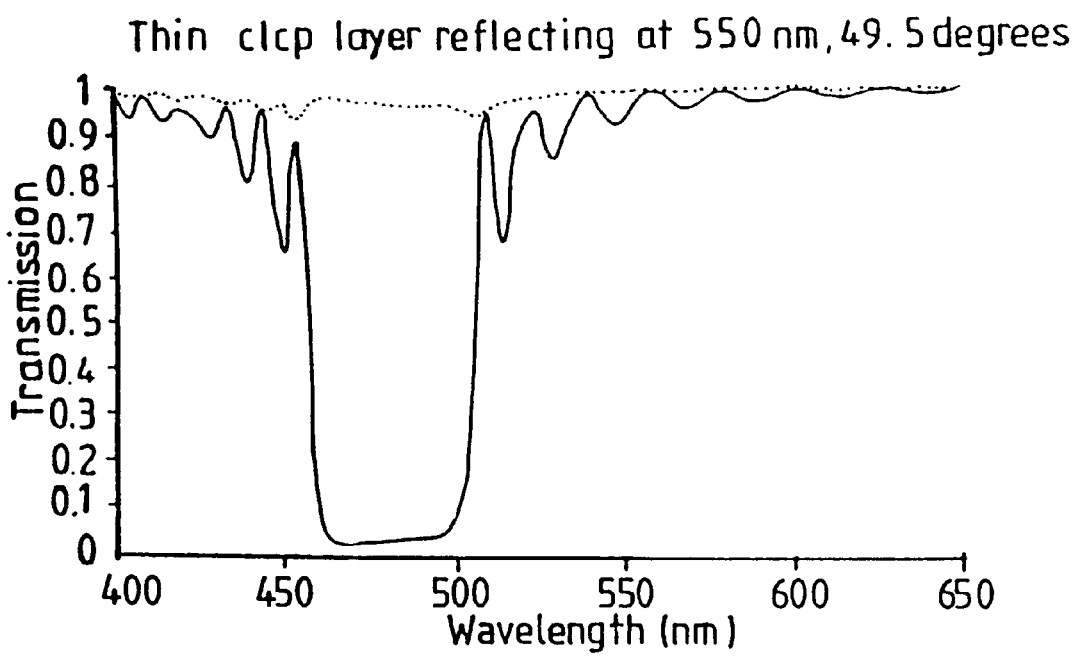
Figure 13A:
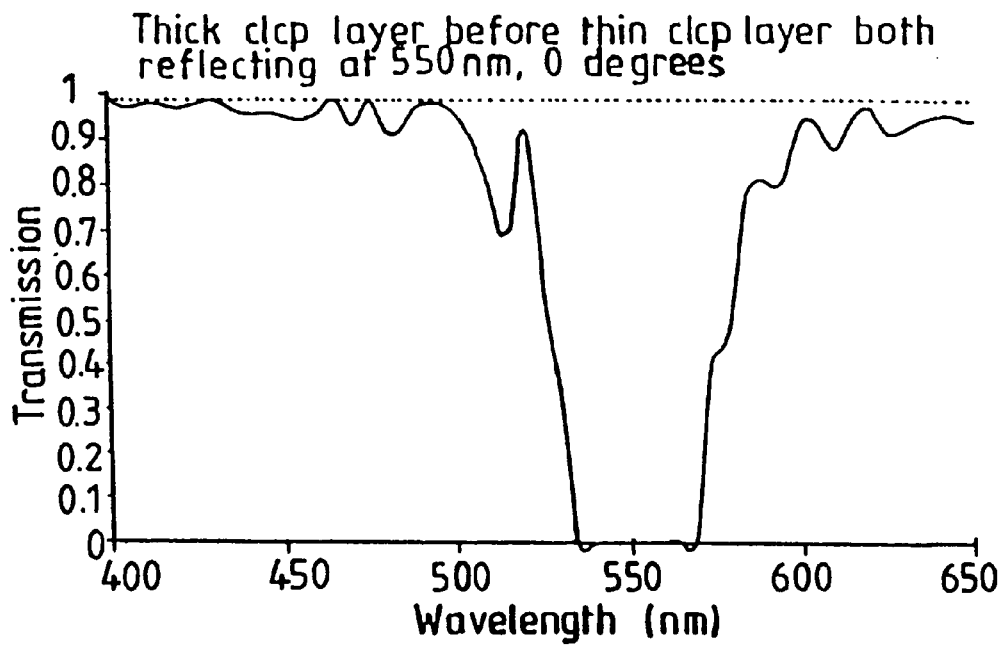
Figure 13B:
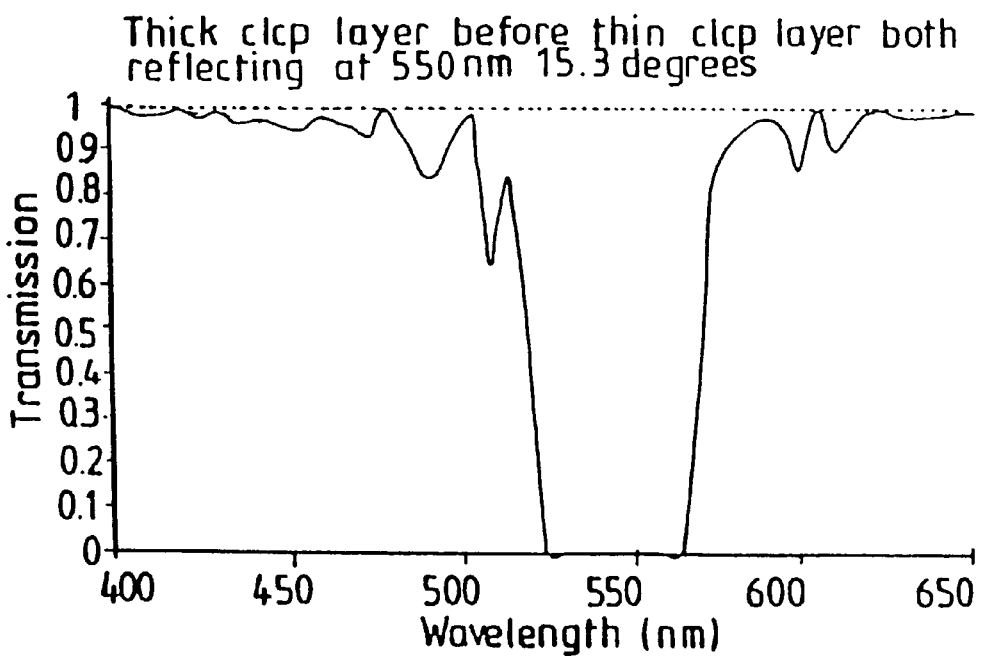
Figure 13C:
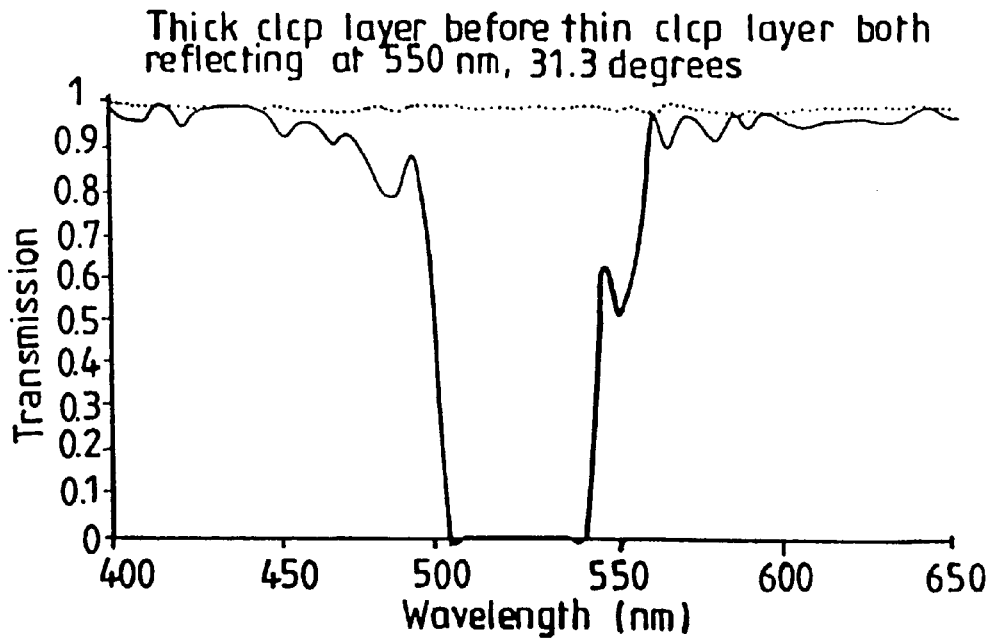
Figure 13D:
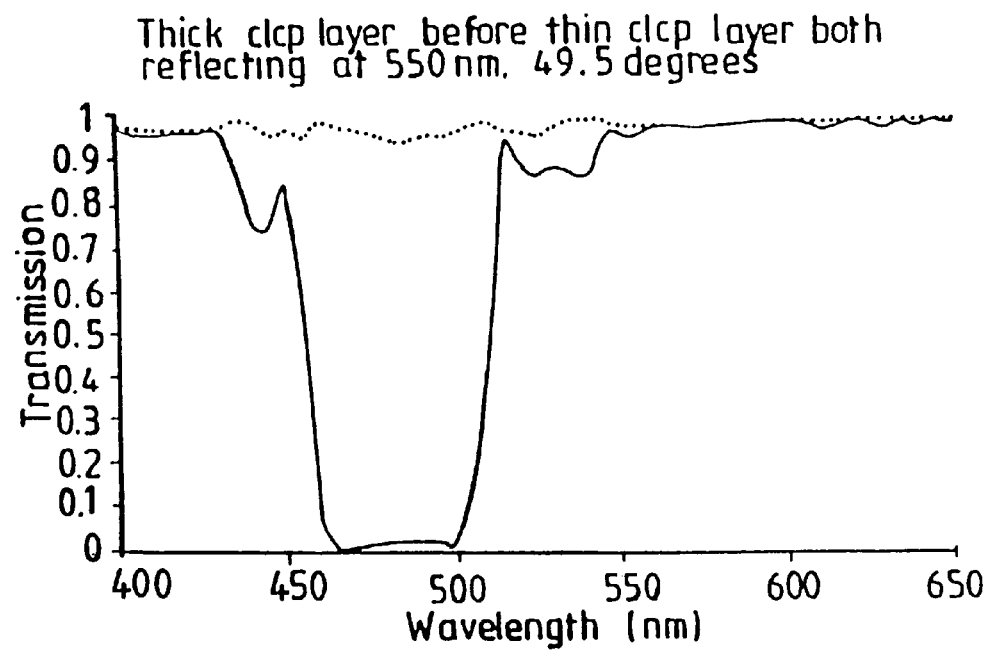
Figure 14A:
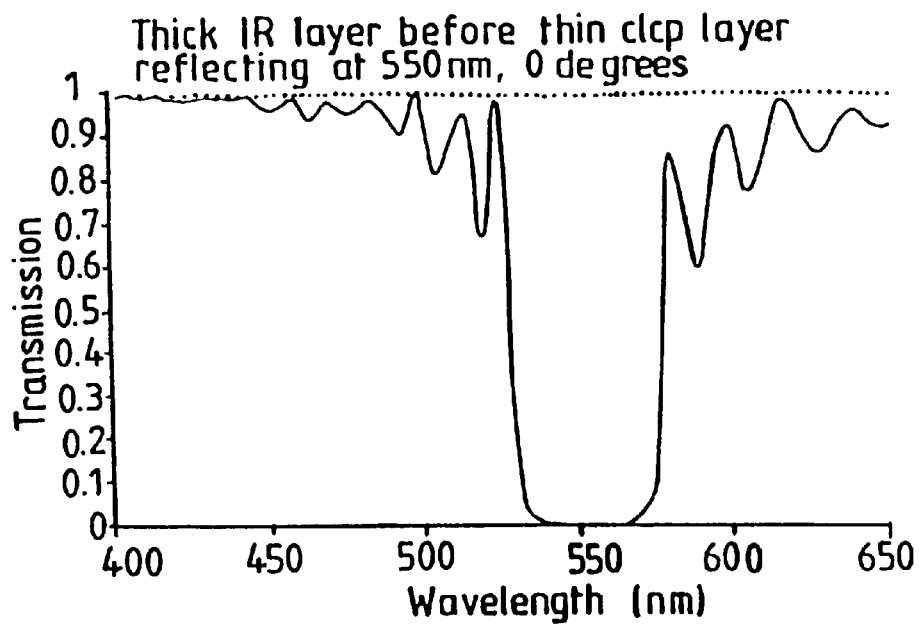
Figure 14B:
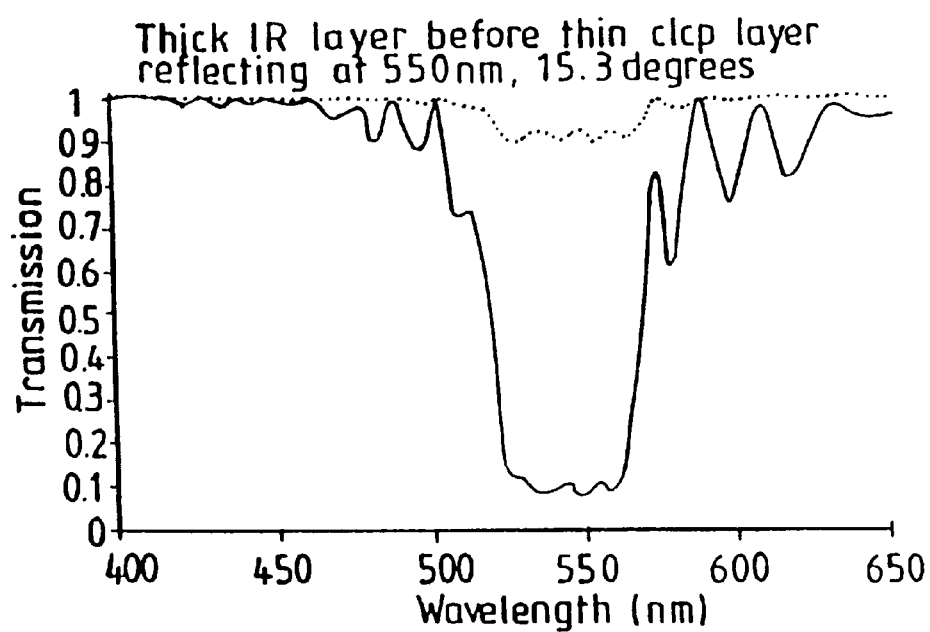
Figure 14C:
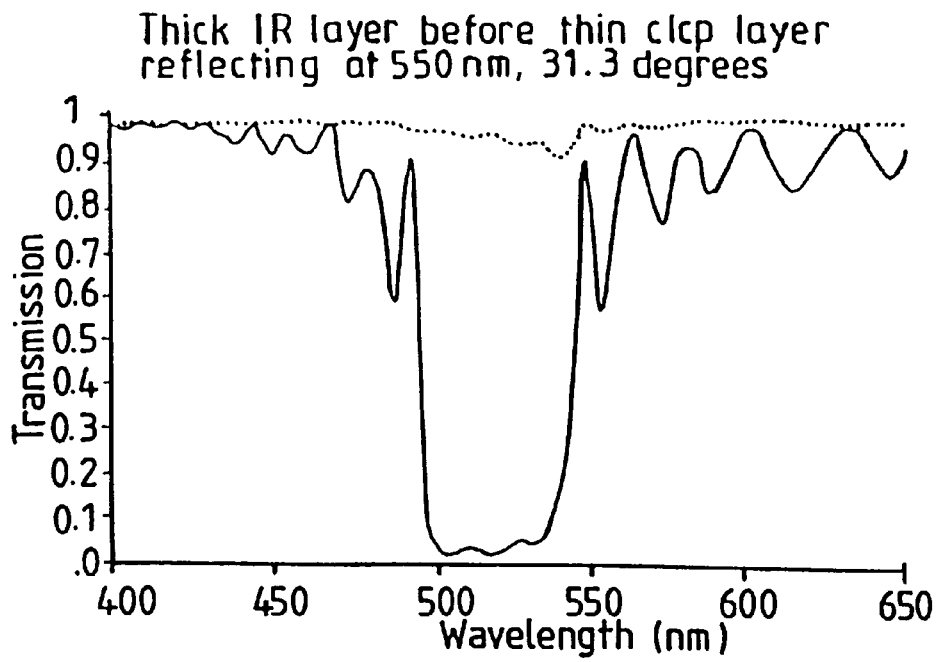
Figure 14D:
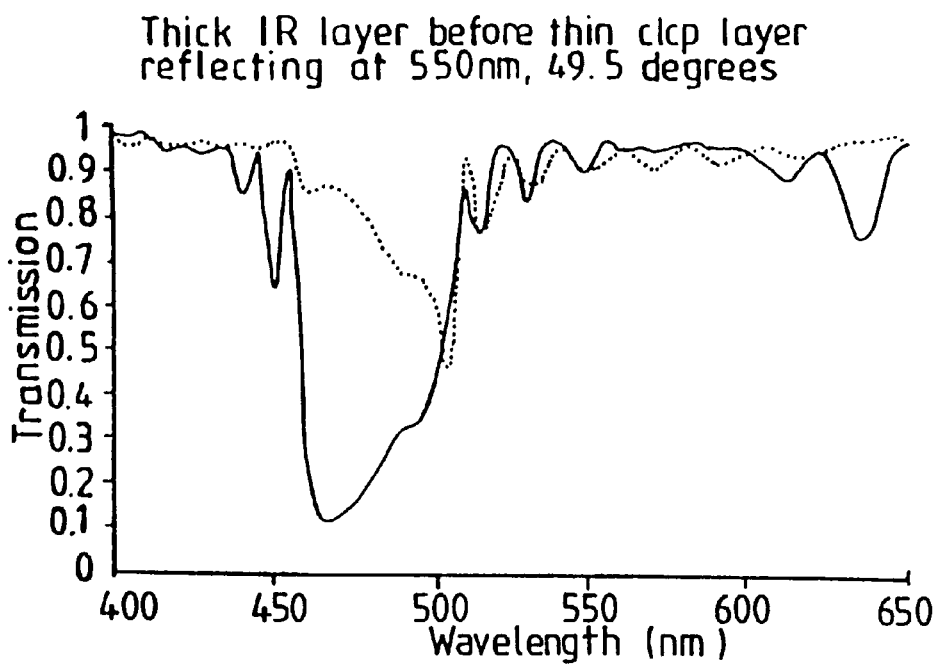
Figure 16:
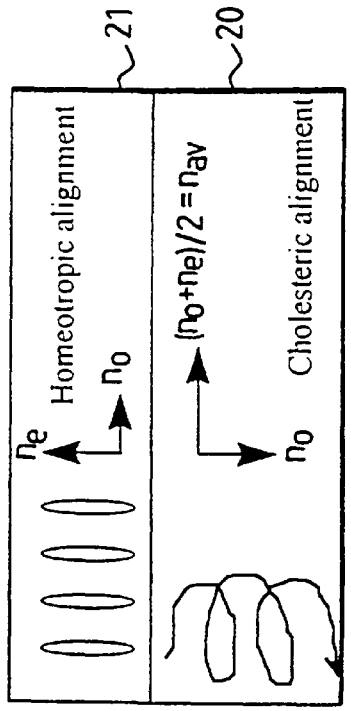
Figure 17:
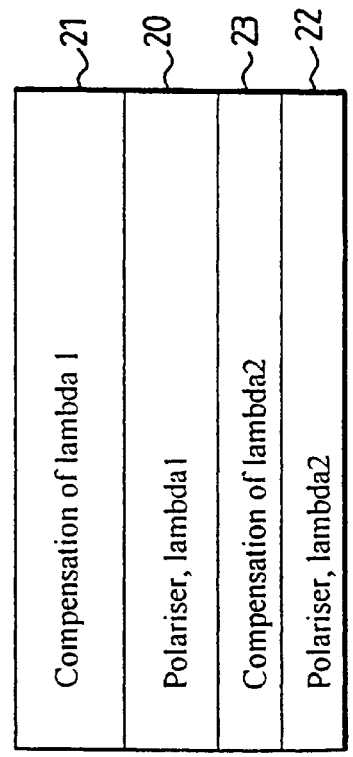
Figure 15:
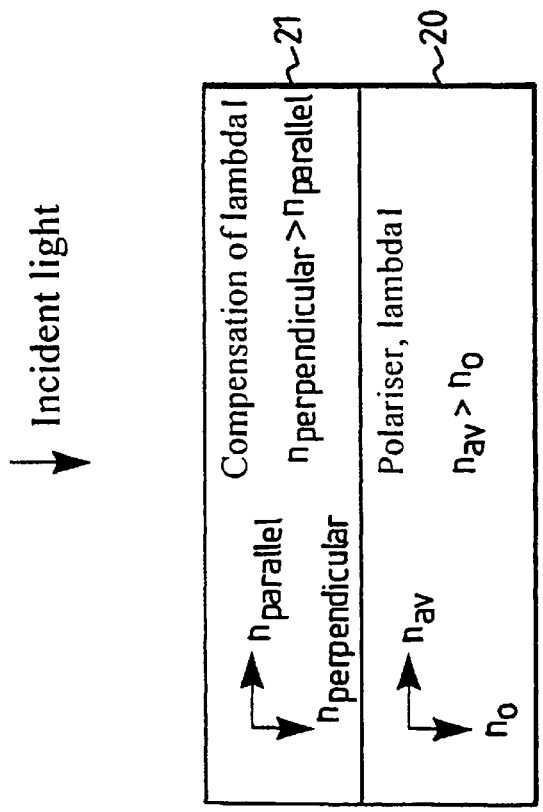
Figure 18:
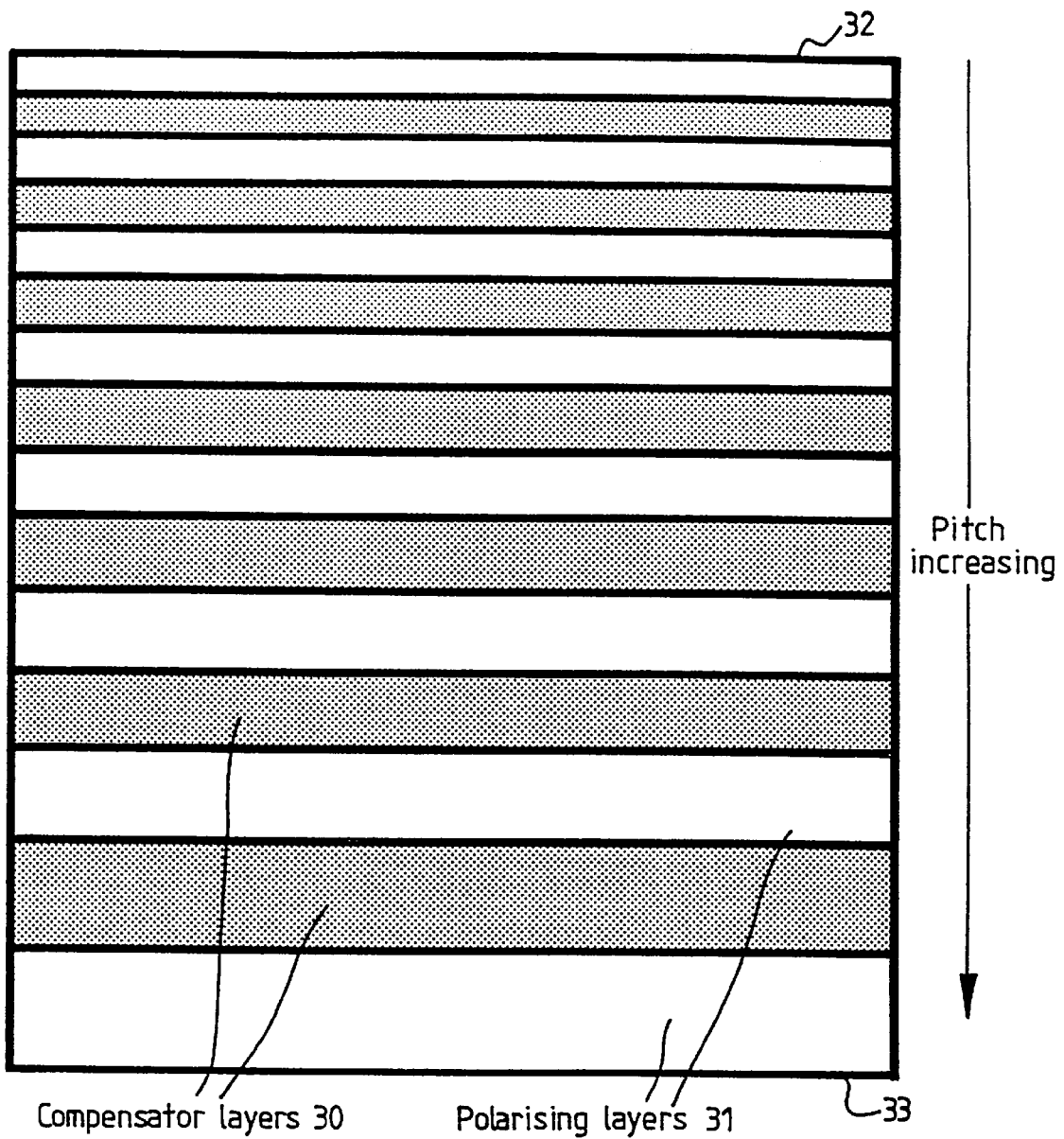
Figure 19A:
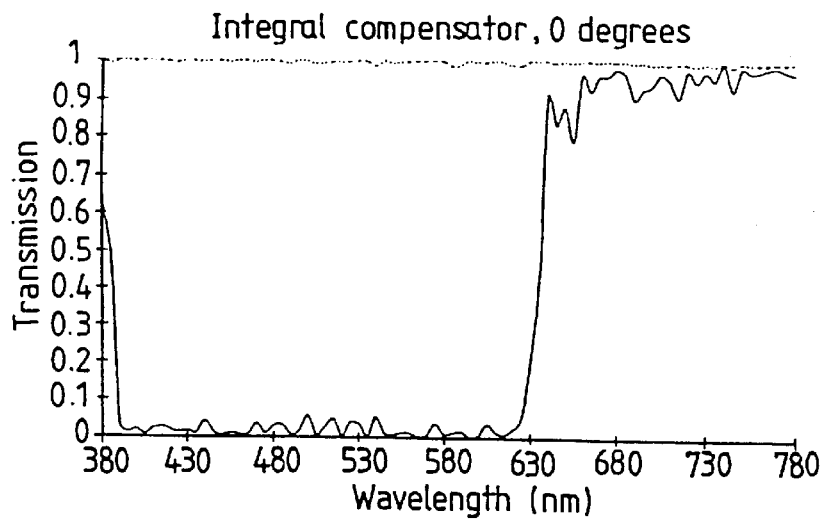
Figure 19B:
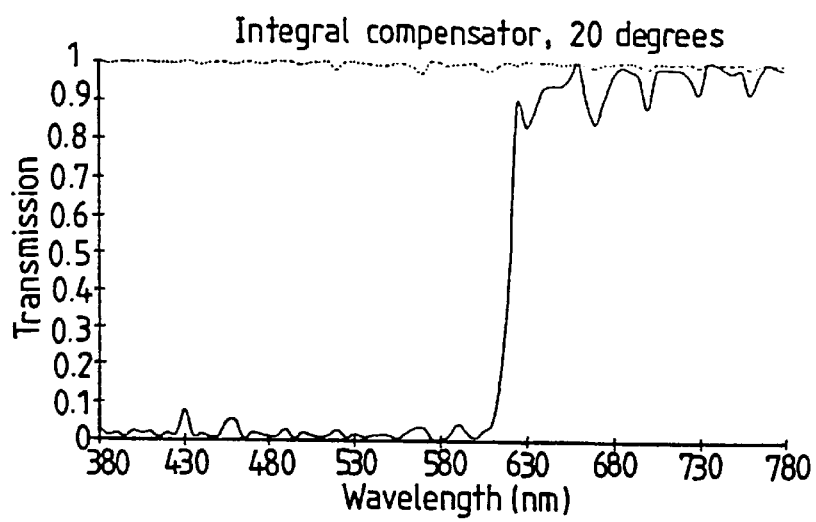
Figure 19C:
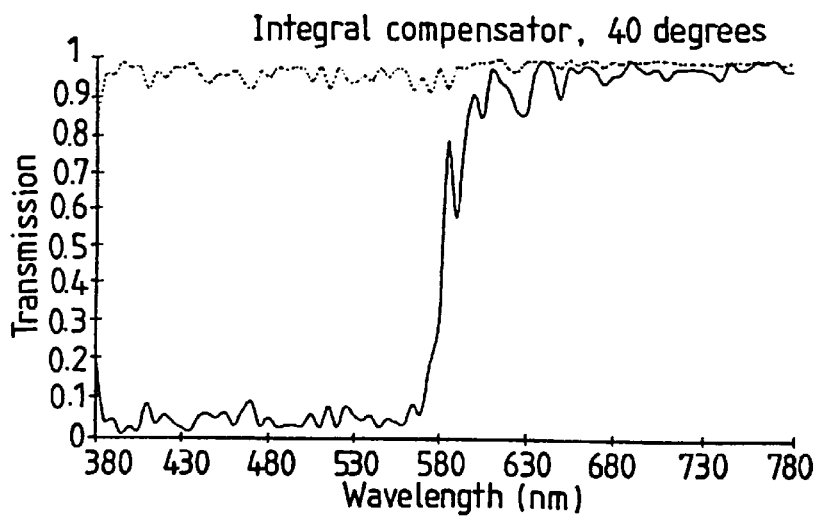
Figure 20A:
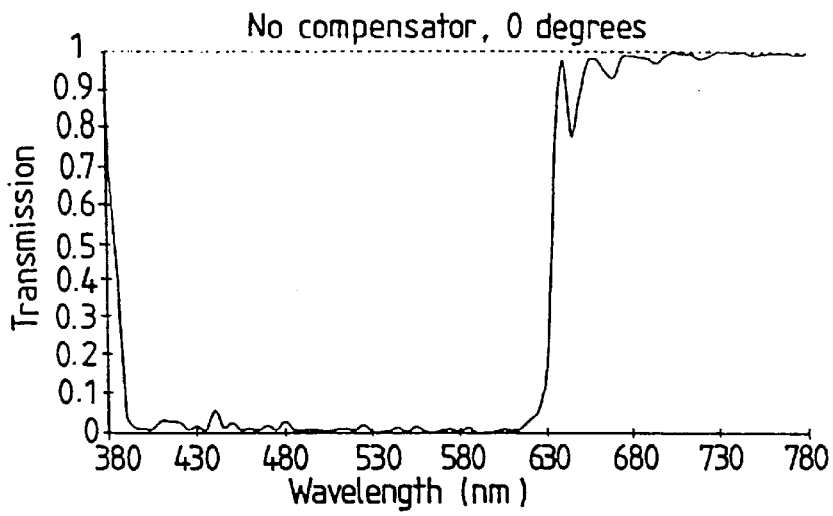
Figure 20B:
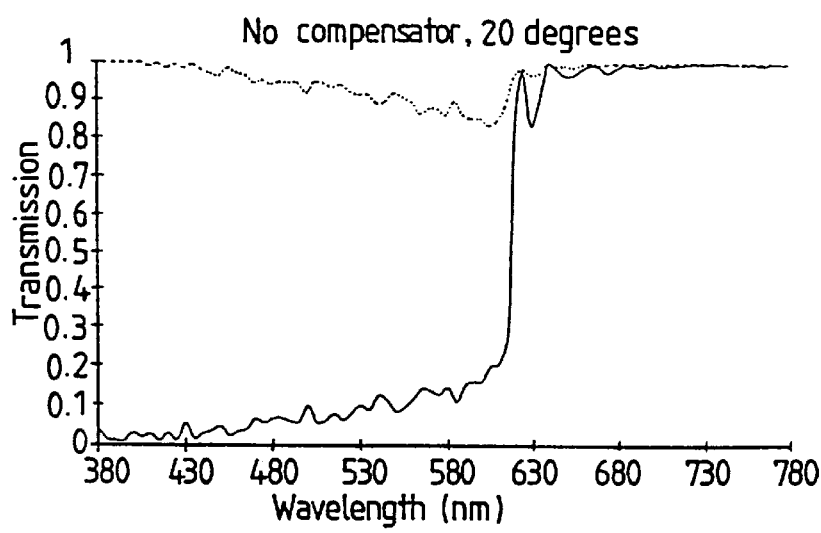
Figure 20C:
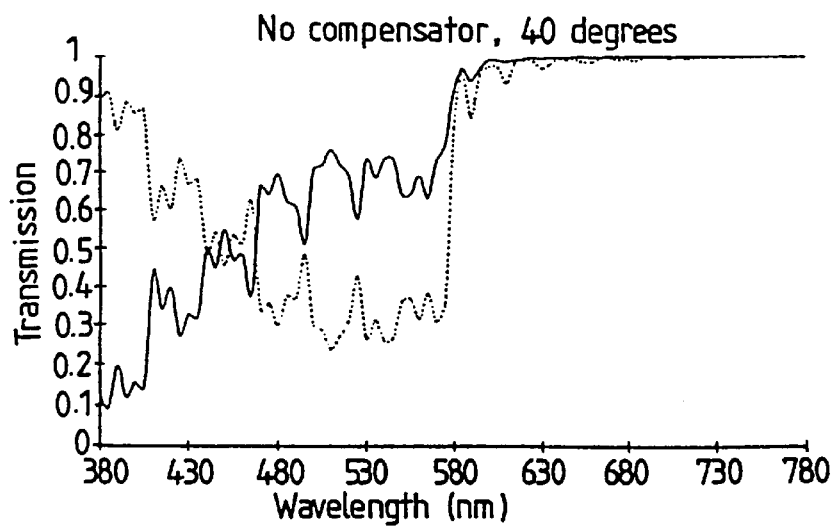

FIGS. 8a to 8c are graphs similar to FIGS. 3a to 3c, respectively, illustrating simulated performance of a cholesteric device whose pitch varies from 244 to 448 nanometres, whose cholesteric refractive indices are 1.53 and 1.63, and whose substrate and superstrate refractive indices are 1.52;

FIGS. 9a to 9c are graphs similar to FIGS. 8a to 8c, respectively, with light passing in the opposite direction through the cholesteric device;

FIG. 10a is a diagrammatic representation of a known single film cholesteric reflector;

FIG. 10b illustrates diagrammatically a simplified structure of part of a layer of FIG. 10a;

FIGS. 11a to 11d are graphs of transmission against wavelength in nanometres for different angles of incidence illustrating the simulated performance of a device of the type shown in FIG. 10a and comprising a layer reflecting at 550 nanometres, having a pitch of 350 nanometres, being fifteen pitches thick, having refractive indices of 1.52 and 1.64, and being covered by a thick ultraviolet layer with a pitch of 240 nanometres and being 200 pitches thick;

FIGS. 12a to 12d are similar to FIGS. 11a to 11d, respectively, illustrating the simulated performance of the same device but omitting the thick ultraviolet layer;

FIGS. 13a to 13c are similar to FIGS. 11a to 11d, respective, showing the simulated performance of a device in which the thick ultraviolet layer is replaced by a thick layer reflecting at 550 nanometres, having a pitch of 350 nanometres, a width of 200 pitches, and refractive indices of 1.52 and 1.64;

FIGS. 14a to 14d are similar to FIGS. 11a to 11d, respectively, and illustrates the performance of a device in which the thick ultraviolet layer is replaced with a thick infrared layer having refractive indices of 1.52 and 1.64, a pitch of 506 nanometres, and a thickness of 95 pitches;

FIG. 15 illustrates diagrammatically the derivation of a broadband cholesteric polariser constituting an embodiment of the invention;

FIG. 16 illustrates diagrammatically a two-layer broadband cholesteric polariser constituting an embodiment of the invention;

FIG. 17 illustrates a four-layer broadband cholesteric polariser constituting an embodiment of the invention;

FIG. 18 illustrates a multilayer broadband cholesteric polariser constituting an embodiment of the invention;

FIGS. 19a to 19c illustrate the angular performance of a multilayer polariser of the type illustrated in FIG. 18 as graphs of transmission against wavelength for different angles of incidence; and FIGS. 20a to 20c are similar to FIGS. 19a to 19c for a multilayer polariser omitting compensating layers.

Figure 1:
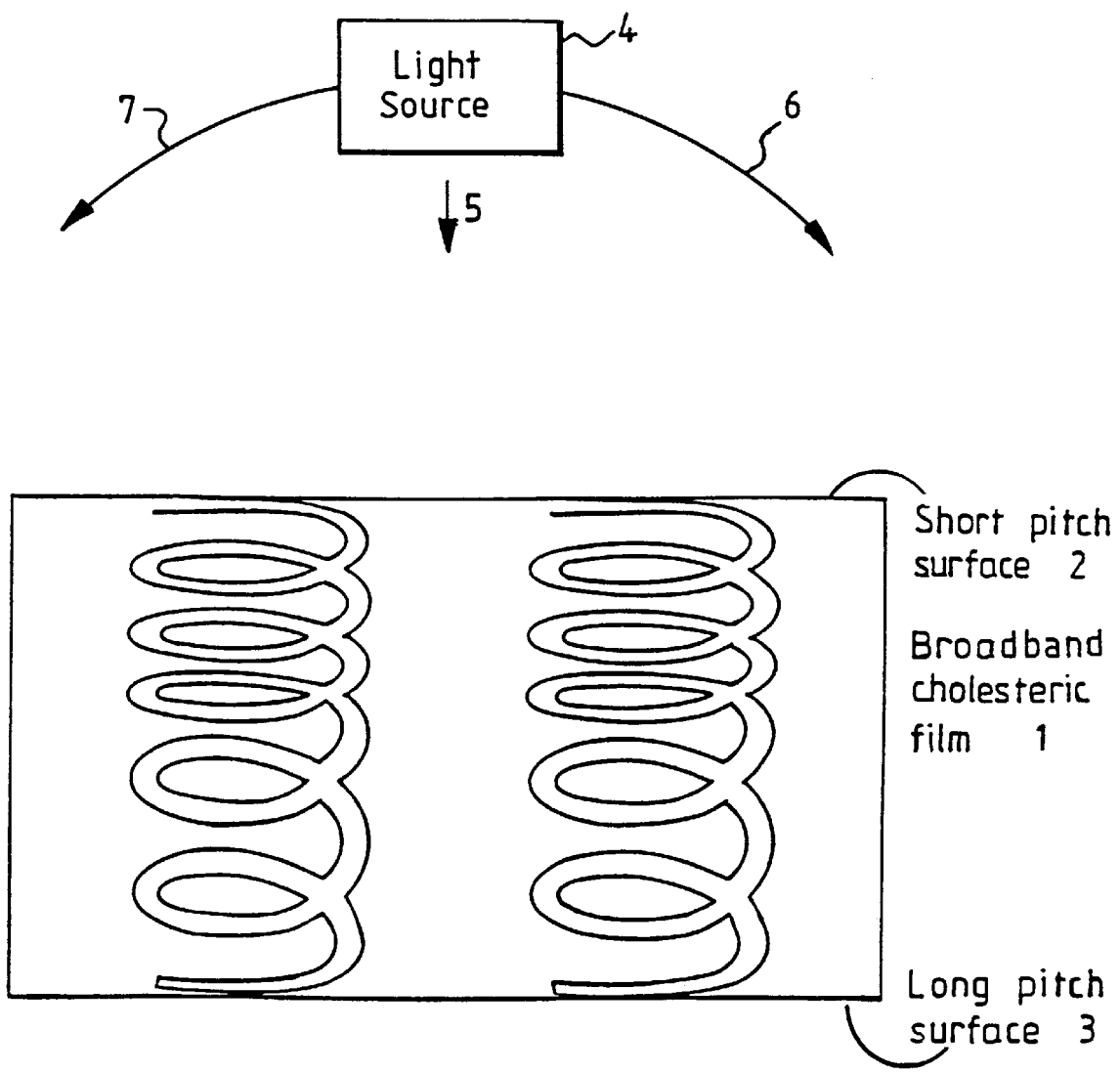
FIGS. 1 and 2 are diagrams illustrating arrangements used to obtain performance data on cholesteric broadband polarisers.

Like reference numerals refer to like parts throughout the drawings:

FIG. 1 shows a broadband graded pitch cholesteric film 1, for instance of the type disclosed in EP 0 606 940. The film 1 comprises a left handed circular polariser having a pitch which increases monotonically from a short pitch surface 2 to a long pitch surface 3. The polariser 1 receives incident light at various angles on and off axis from a light source 4 which directs a beam of collimated light in a direction indicated by an arrow 5. The light source is movable as indicated by arrows 6 and 7 to vary the angle of incidence of the light beam 5 on the short pitch surface 2 of the polariser 1.

Figure 2:
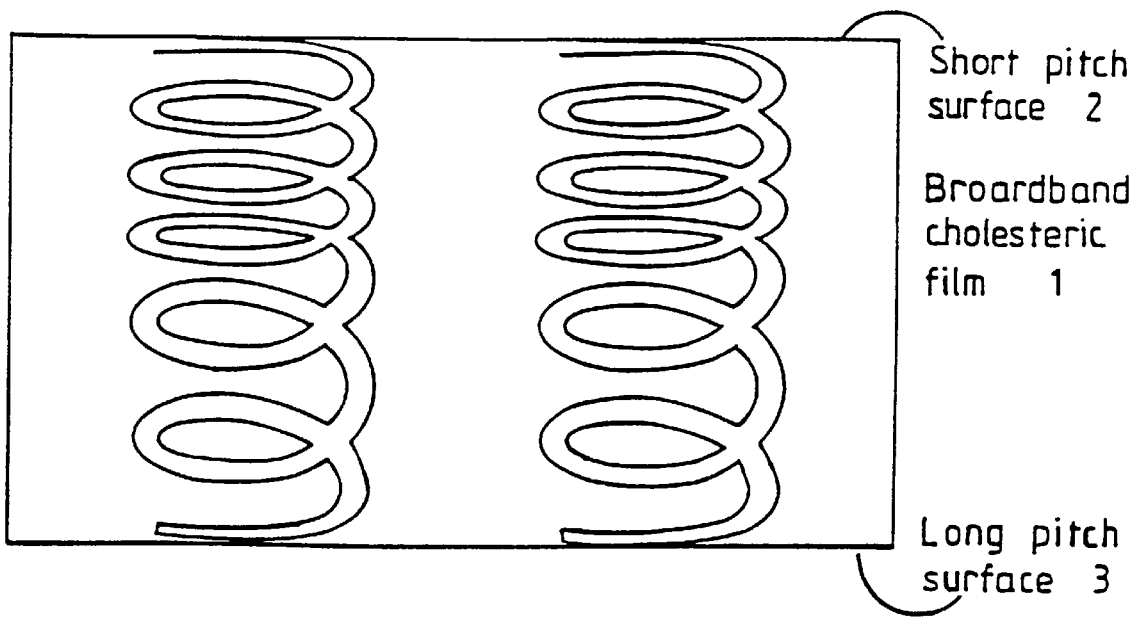
Figure 2:
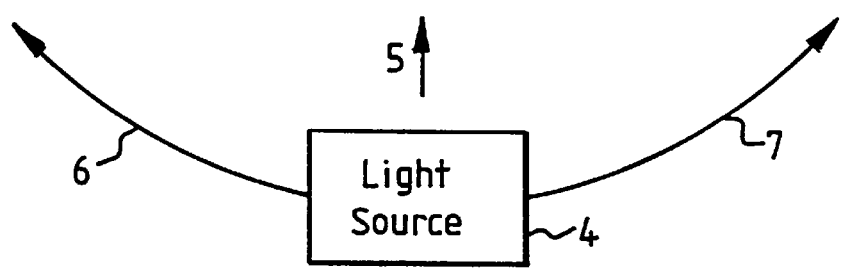

FIG. 2 differs from FIG. 1 in that the light source is arranged to direct light onto the long pitch surface 3 of the polariser 1.

FIG. 3a of the accompanying drawings is a graph of transmittance in percent against wavelength in nanometres illustrating the performance of the polariser 1 illuminated on its short pitch surface 2 by white light as shown in FIG. 1 with an angle of incidence of zero degrees. The unbroken line illustrates the transmittance of right handed circularly polarised light whereas the broken line illustrates the transmittance of left-handed circularly polarised light. In order to act as an achromatic broadband polariser, the ideal performance would be for the left handed circularly polarised light to be transmitted with a uniform transmittance across the whole of the visible spectrum with minimal insertion loss whereas the right handed circularly polarised light would be uniformly attenuated across the visible spectrum with maximal attenuation. As shown in FIG. 3a, the on-axis performance of the polariser 1 approaches the ideal performance and is adequate for many practical applications.

FIG. 3b is a graph similar to that of FIG. 3a but illustrates the performance for light which is incident on the short pitch surface 2 at 20 degrees. The attenuation performance for right handed circularly polarised light is slightly degraded and the curve for left handed circularly polarised light is showing signs of some degradation of achromatic performance.

FIG. 3c illustrates operation for light incident at 40 degrees. The transmittance curves for left handed and right handed circularly polarised light are similar so that the extinction ratio (ratio of transmittance of the desired polarisation to the transmittance of the undesired polarisation) is very poor and, throughout part of the visible spectrum, is negative. Thus, as the angle of incidence increases, the performance of the broadband polariser 1 deteriorates until, at angles of incidence of the order of 40 degrees, the polariser ceases to act as a polariser at all.

Figure 4A:
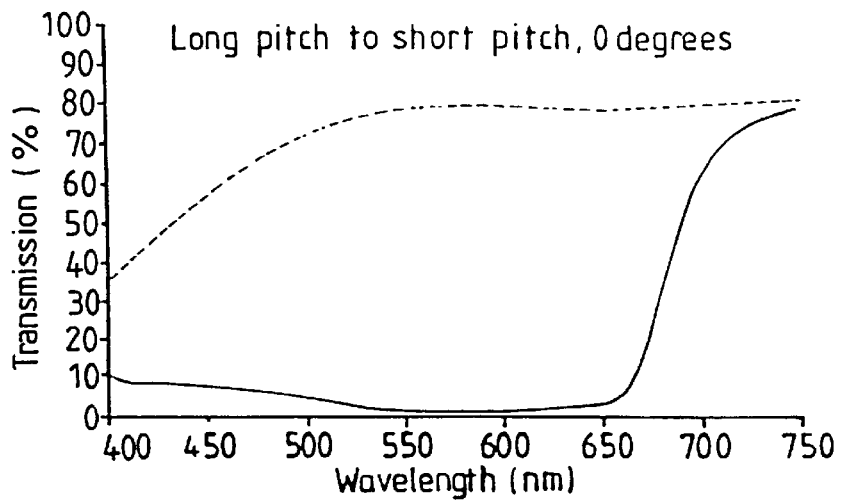
FIGS. 4a to 4c are graphs similar to FIGS. 3a to 3c, respectively, showing the performance for light passing in the opposite direction.
Figure 4B:
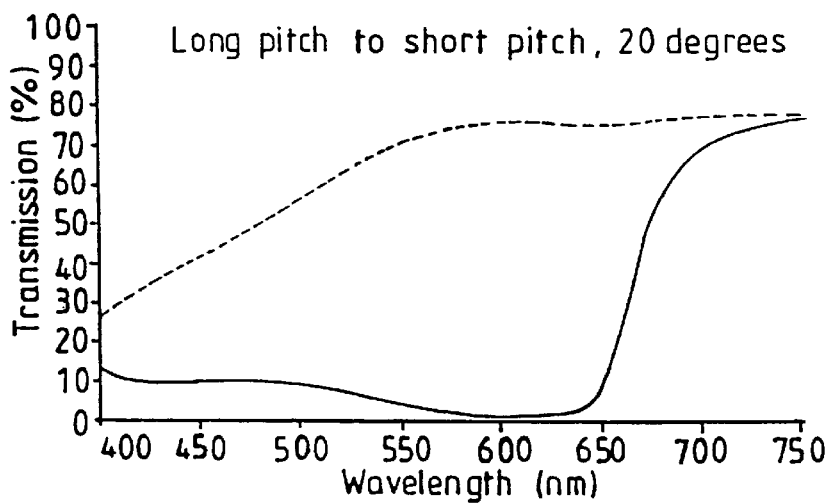
Figure 4C:
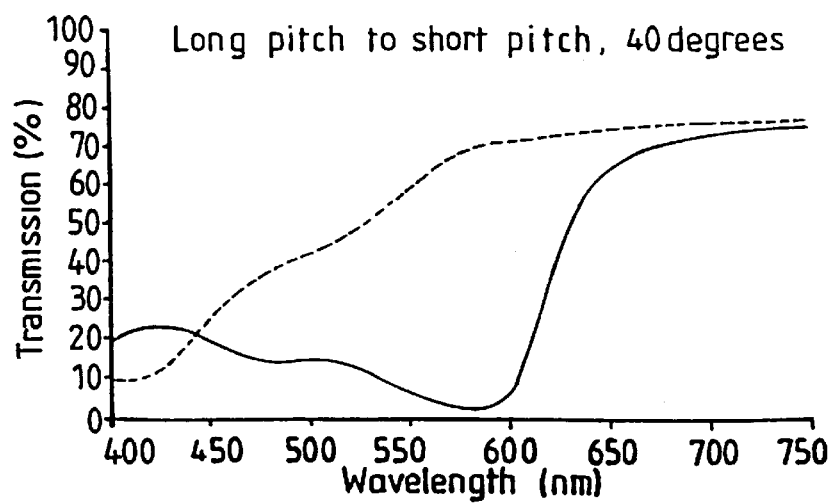

FIGS. 4a to 4c of the accompanying drawings correspond to FIGS. 3a to 3c, respectively, but illustrate the performance for light incident at angles of 0, 20 and 40 degrees on the long pitch surface of the broadband polariser 1 as illustrated in FIG. 2. Again, the performance deteriorates with increasing angle of incidence such that the achromaticity of the polariser reduces and the extinction ratio reduces until, for high angles of incidence, the polariser ceases to be effective at all for at least part of the visible spectrum.

Comparison of FIGS. 3a and 4a shows that the performance on axis of the polariser 1 is very similar for light incident on the short pitch surface 2 and on the long pitch surface 3. Comparison of FIGS. 3b and 4b shows that the performance when light is incident on the long pitch surface 3 falls off a wavelength reduces more quickly than for light incident on the short pitch surface 2, so that operating the polariser with the long pitch surface 3 toward a light source causes more loss in achromaticity than for when the short pitch surface receives the incident light. Thus, the performance deterioration at an off-axis angle of 20 degrees is greater for light incident on the long pitch surface 3 than for light incident on the short pitch surface 2.

Operation for light incident at 40 degrees off-axis is illustrated in FIGS. 3c and 4c. With light incident on the short pitch surface 2, the polariser 1 has ceased to act as a polariser. With light incident on the long pitch surface 3, polarisation is still taking place but achromaticity performance is very poor.

Figure 5:
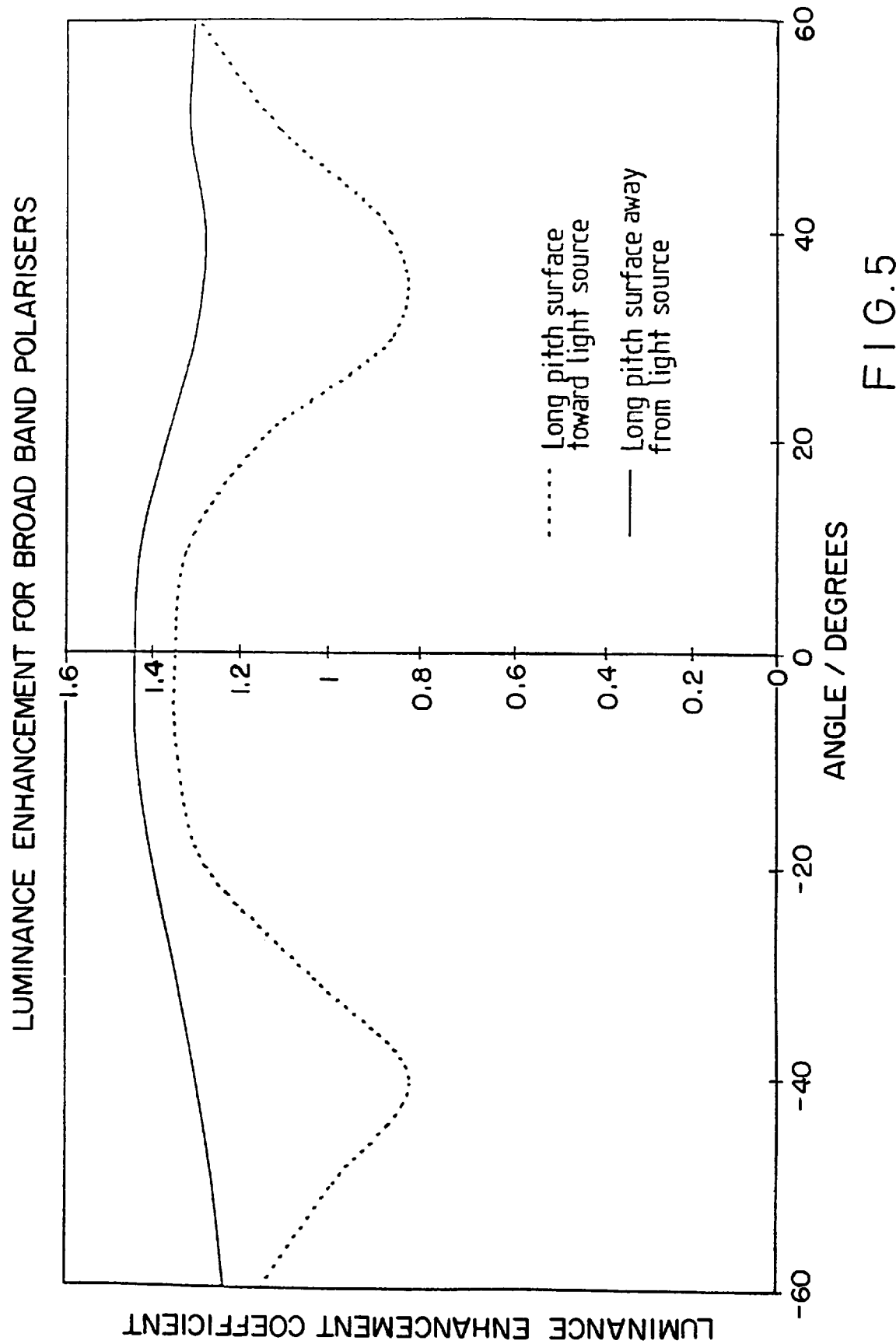
FIG. 5 is a graph of luminance enhancement coefficient against angle illustrating the performance of backlights for liquid crystal displays.

FIG. 5 illustrates the luminance enhancement for broadband polarisers 1 as illustrated in FIGS. 1 and 2 when disposed in an LCD with a quarter wave form. Luminance enhancement coefficient is given as the ratio of luminance with the polariser 1 to the luminance of the backlight alone for different angles of incidence in degrees. The broken line curve illustrates the performance with the long pitch surface 3 toward a light source whereas the unbroken line curve illustrates the performance for the short pitch surface 2 towards the light source. As is clearly shown by FIG. 5, substantial luminance enhancement is achieved with the short pitch surface 2 towards the light source throughout a very large range of angles of incidence which, in practice, encompasses all angles of incidence of interest when using a broadband polariser for most or all applications.

Figure 6:
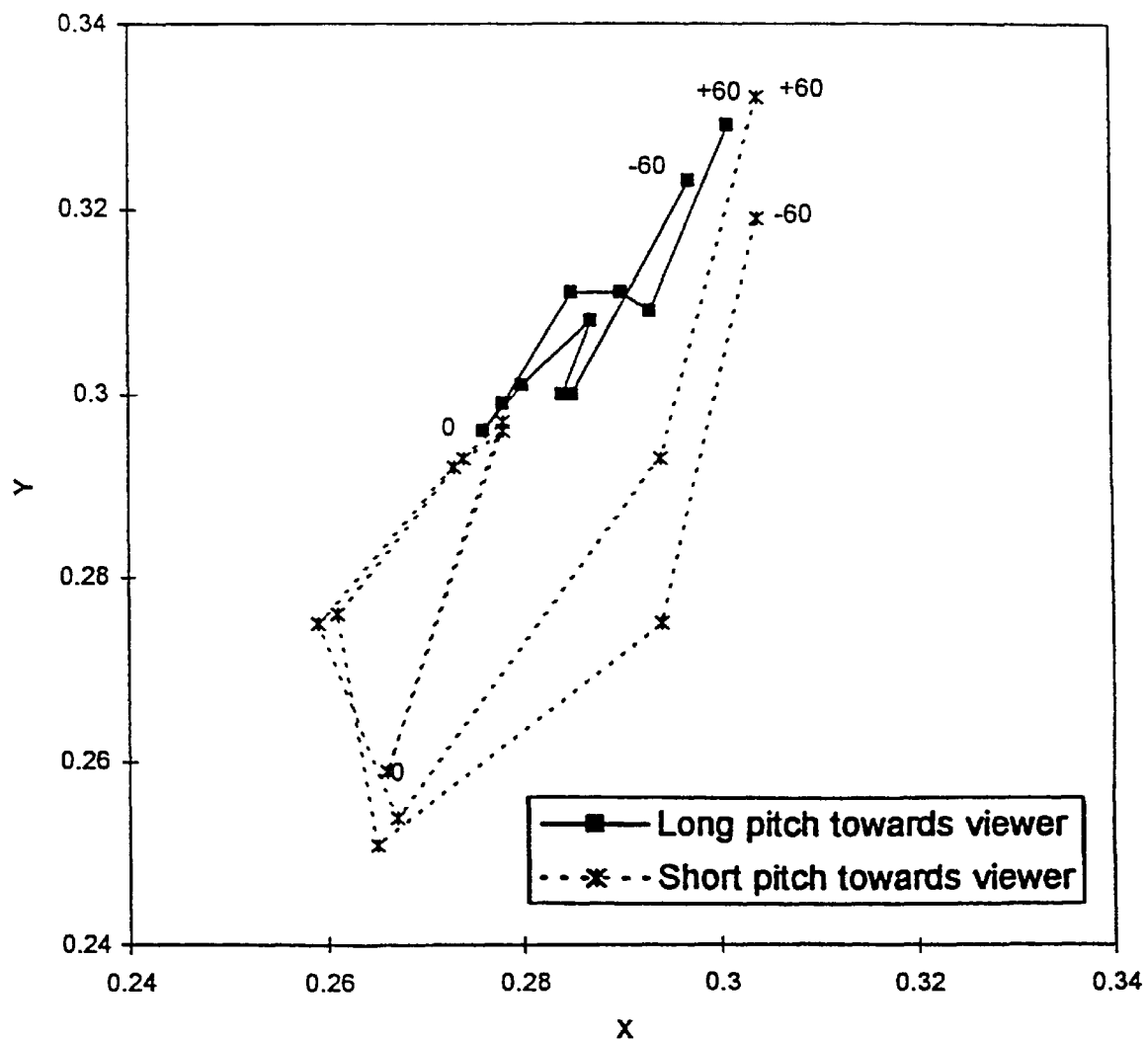
FIG. 6 is a standard color coordinate diagram illustrating variation of performance against angle of view.

FIG. 6 illustrates graphically the color coordinates against angle of view for the polariser 1 with the broken lines illustrating performance with the short pitch surface 2 towards the viewer (i.e. long pitch surface 3 towards the light source) and the unbroken lines illustrating performance with the long pitch surface 3 towards the viewer (with the short pitch surface 2 towards the light source). As is clearly illustrated, the variation in color coordinates is much less when the short pitch surface 2 is towards the light source.

Figure 7:
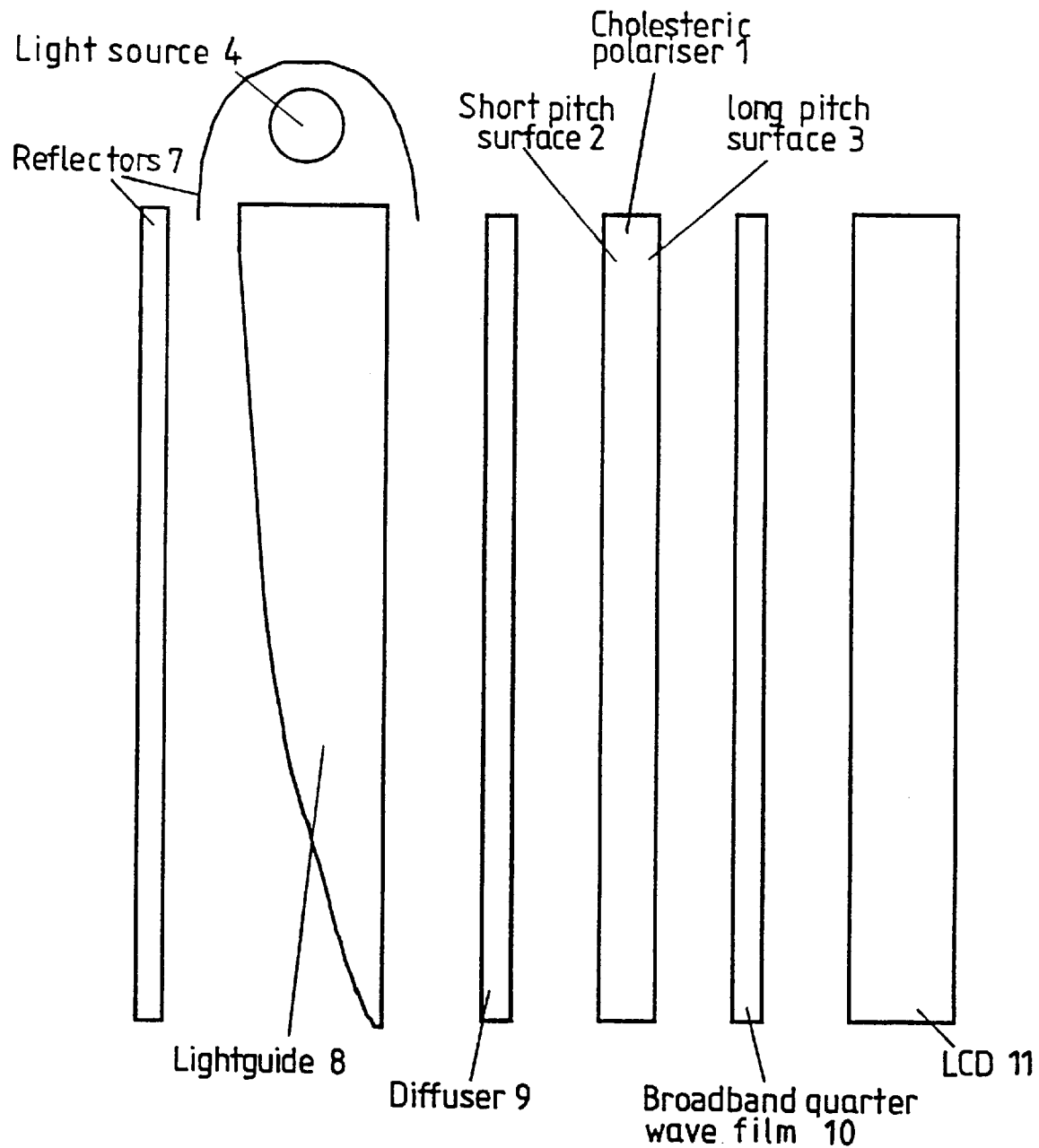
FIG. 7 is a diagrammatic sectional view illustrating an optical device constituting an embodiment of the invention.

FIG. 7 illustrates a backlight incorporating the cholesteric polariser 1 shown in FIGS. 1 and 2. The backlight comprises a light source 4, reflectors 7, a light guide 8 and a diffuser 9 for providing diffuse or Lambertian light over a substantial area. Thus, light leaves the diffuser 9 over a large range of angles of emergence. The cholesteric polariser 1 is disposed with its short pitch surface 2 adjacent the output surface of the diffuser 9. The polariser 1 is intended to transmit left handed circularly polarised light and reflect right handed circularly polarised light over a relatively broad bandwidth, in particular over the band within the visible spectrum in which the light source 4 emits light. A broadband quarter wave film 10 is disposed adjacent the long pitch surface 3 of the polariser 1 to convert the circularly polarised light to linearly polarised light, which is then supplied to a liquid crystal display LCD 11.

As described hereinbefore, the improved angular performance of the polariser 1 with the short pitch surface 2 towards the light source results in improved light efficiency, for instance compared with the similar arrangement in which the long pitch surface 3 is disposed adjacent the diffuser 9. For a given light source 4, increased display brightness is achieved. Alternatively, a smaller light source 4 may be used, for instance to reduce the power consumption. In the case of battery-powered displays, this allows a smaller and lighter battery to be used or increases the battery life.

FIGS. 8a to 8c and 9a to 9c correspond to FIGS. 3a to 3c and 4a to 4c, respectively, but illustrate the results of a simulation using a 4×4 transfer matrix optics modeling program. The simulated performance represents a reasonably close approximation to the performance actually obtained and assists in understanding the mechanisms involved in degrading the optical performance of the broadband polariser.

The response may be understood in terms of the off-axis birefringence of the thick cholesteric layer which is optically in front of the layers of cholesteric material at some distance from the illuminated surface of the polariser. For example, the region of the broadband polariser which reflects circularly polarised light at a wavelength of 550 nanometres is separated from the light source by a thick layer of cholesteric liquid crystal polymer (CLCP) which alters the polarisation state of the off-axis incident polarised light. This is illustrated in FIG. 10a, which shows the polariser 1 having an intermediate layer 12 responsible for reflection at 550 nanometres. The layer 13 of the polariser 1 between the layer 12 and the surface 2 alters the polarisation state of the off-axis incident light.

The effect of this thick layer 13, which has a smaller pitch than that of the layer 12 for reflecting light at 550 nanometres at normal incidence, may be considered by approximating the layer 13 of varying pitch by means of a layer of constant pitch which is much smaller than the pitch of the layer 12. In this case, the chiral nature of the thick layer 13 is not "visible" to incident light of 550 nanometer wavelength. To a first approximation, such light sees the "averaged structure" illustrated in FIG. 10b. The layer 13 is thus simulated as a layer whose pitch corresponds to UV wavelengths.

FIGS. 11a to 11d are graphs of transmission against wavelength for light incident on the simulated structure comprising the UV layer and the layer 12 at angles of incidence of zero, 15.3, 31.3 and 49.5 degrees, respectively. FIGS. 12a to 12d correspond to FIGS. 11a to 11d, respectively, but for a simulation in which the UV layer is omitted. These results illustrate that, off-axis, the polarisation state of the incident light is substantially affected by the thick UV layer such that right handed circularly polarised light is partially converted to left handed circularly polarised light, which is not reflected by the layer 12 reflecting at 550 nanometres. Further, the left handed circularly polarised light is partially converted to right handed circularly polarised light which is reflected by the layer 12. Thus, the averaged structure illustrated in FIG. 10b has a performance which is consistent with the effects of off-axis birefringence and this is believed to be the mechanism which causes the off-axis deterioration in performance.

FIGS. 13a to 13d correspond to FIGS. 12a to 12d, respectively, but illustrate the simulated result where the thin CLCP layer 12 reflecting at 550 nanometres ("green") wavelength is covered by a thick CLCP of the same pitch and thus reflecting at the same wavelength as the layer 12. Averaging of the chiral structure does not take place and, for the parameters and angles illustrated, there is negligible difference between the off-axis behavior of the thin and thick "green" layers as may be seen by comparing FIGS. 12a to 12d with FIGS. 13a to 13d, respectively.

FIGS. 14a to 14d correspond to FIGS. 12a to 12d but illustrate the effect of covering the thin layer 12 with a thick layer which has a larger pitch such that it is reflective to on-axis infrared radiation. The presence of this layer affects performance as illustrated in FIGS. 14a to 14d. However, as may be seen by comparing FIGS. 11a to 11d with FIGS. 14a to 14d, respectively, the effect of the thick layer depends on whether its pitch is greater or less than that of the layer 12 having a pitch capable of reflecting the incident light.

Although not shown, similar off-axis birefringence effects occur if a thick cholesteric layer is provided after each reflecting layer.

A broadband cholesteric polariser 1 having the properties as measured in FIGS. 3a to 3c and 4a to 4c was made as follows. The starting material was 80% CC 4039 L: 20% CC 4070 L cholesteric material from Wacker-Chemie with the addition of 3% by weight photoinitiator which enabled the film to cross-link when exposed to ultraviolet light. A film of the cholesteric liquid crystal polymer was created by rubbing the surfaces of two pieces of glass and shearing a small quantity of polymer between the two pieces of glass. Large samples may be made on a heated glass or polymer surface by standard coating or lamination techniques. Suitable film thicknesses are between 10 and 100 microns.

The film was aligned for thirty minutes at 90 degrees centigrade and subsequently exposed to ultraviolet light of 0.2 mW/cm$^2$ for four minutes using a 310 nanometer transmission filter with a bandwidth of 10 nanometer maintaining the temperature at 90 degrees centigrade. The film was further heated at 90 degrees centigrade for three to twenty hours. After removing the film from the heat, it was permanently fixed by exposure to broadband ultraviolet at 20 degrees centigrade for five minutes.

It is also possible to make the polariser 1 using different starting materials, such as other cross-linkable cholesteric liquid crystal polymers, reactive mesigens with chiral dopants or reactive acrylate monomers with chiral dopants. FIGS.

FIGS. 15 to 17 illustrate the principles behind a broadband cholesteric polariser constituting another embodiment of the invention. FIG. 15 illustrates diagrammatically a cholesteric polariser in the form of a layer 20 of cholesteric material operating at a wavelength lambda 1. The layer 20 has refractive indices $n_o$ and $n_e$ and a thickness necessary for correct performance. The pitch of the cholesteric material may vary throughout the thickness of the layer 20 or may be substantially constant. To wavelengths outside the bandwidth of the polarising layer 20, the layer 20 may be approximated by a macroscopic refractive index structure as illustrated in FIG. 10b.

It is desirable that wavelengths of light outside the bandwidth of the polarising layer 20 pass therethrough with little modification to their polarisation state. In order to achieve this as the angle of incidence of light is changed, a compensating layer 21 is disposed adjacent the polarising layer 20 and has a macroscopic refractive index structure which is the inverse of that illustrated in FIG. 10b. Thus, the refractive index $n_{perpendicular}$ perpendicular to the layer 21 is greater than the refractive index $n_{parallel}$ which is oriented in the layer 21. The internal structure of the compensating layer 21 need not be chiral and could, for example, be homeotropic. As the angle of incidence of light is varied, the overall effective refractive index of the layers 20 and 21 is maintained. The thickness of the compensating layer 21 is selected so as to provide maximum compensation as the angle of incidence is varied.

FIG. 16 illustrates a two layer embodiment of the invention in which the polarising layer 20 has cholesteric alignment and the refractive indices shown and the compensating layer 21 has homeotropic alignment and the refractive indices shown. The layer 20 has substantially uniform pitch throughout its thickness.

During manufacture, for instance from the starting material described hereinbefore, the cholesteric film is aligned at a suitable temperature for a suitable period of time so as to establish the desired pitch throughout the cholesteric film. The cholesteric layer 20 is then fixed by exposure to narrow bandwidth ultraviolet light so as to cross-link the cholesteric liquid crystal polymer within the layer 20 but so as not to fix the material within the layer 21. When the layer 20 has been fixed, the conditions are changed, for instance by changing the temperature and applying an electric or magnetic field to the film so as to form the homeotropic alignment within the layer 21. The layer 21 is then fixed by exposure to broadband ultraviolet radiation.

In an alternative embodiment, each of the layers 20 and 21 is formed individually and the polariser is then formed by laminating the layers together.

FIG. 17 illustrates a four layer polariser comprising the layers 20 and 21 together with a further polarising layer 22 and a further compensating layer 23. The polarising layer 22 operates at a wavelength lambda 2 which is different from lambda 1. The compensating layer 23 is provided for the polarising layer 22 such that wavelengths of light outside the bandwidth of the polarising layer 22 pass therethrough with little modification to their polarisation state. Thus, the layers 22 and 23 are formed in the same way as the layers 20 and 21 as illustrated in FIGS. 15 and 16.

The layers 20 to 23 may be formed in a single film as described hereinbefore using the same cholesteric starting material. In this case, the layer 22 is formed first by aligning at a suitable temperature and for a suitable time period to achieve the desired pitch of the cholesteric material. The lower surface of the film is irradiated with narrow band ultraviolet radiation so as to fix the layer 22. The conditions are then changed, for instance to include the application of an electric or magnetic field such that the unfixed part of the film adopts the homeotropic alignment. The film is then irradiated from below by narrow band ultraviolet radiation such that the layer 23 is fixed. The layers 20 and 21 are then formed as described hereinbefore with reference to FIG. 16.

Alternatively, some or all of the layers 20 to 23 may be formed individually from the same or different starting materials and may subsequently be laminated together to form the broadband polariser.

FIG. 18 illustrates diagrammatically a broadband cholesteric polariser constituting a further embodiment of the invention. The polariser comprises a multi-layer structure of compensating layers such as 30 alternating with cholesteric polarising layers such as 31. Any number of polarising layers 31 may be provided and each layer is preferably provided with its own compensating layer as described with reference to FIGS. 15 to 17. The polarising layers 31 may be of substantially constant pitch with the pitches of the layers increasing monotonically from the surface 32 to the surface 33. Alternatively, some or all of the polarising layers 31 may be of graded pitch such that the average pitches of the layers 31 increase monotonically from the surface 32 to the surface 33.

The layers 30 and 31 may be formed in a single film of cholesteric starting material as described with reference to FIGS. 15 to 17. Alternatively, the polariser may be formed from several films which may provide individual layers or groups of layers, the films being laminated together to form the polariser.

FIGS. 19a to 19c illustrate the performance of a multi-layer broadband polariser of the type shown in FIG. 18 and comprising eight cholesteric layers with pitches of 253, 272, 291, 310, 329, 348, 367 and 386 nanometres. Each cholesteric layer is 15 pitches thick. Seven integral compensating layers are provided with refractive indices $n_o=1.53$ and $n_e=1.58$. Performance with light incident at zero, 20 and 40 degrees is illustrated in FIG. 19a to 19c, respectively. For comparison, FIGS. 20a to 20c correspond to FIGS. 19a to 19c, respectively, but illustrate the performance of a broadband polariser having the same cholesteric layers but omitting the compensating layers. As shown in FIGS. 19a to 19c, the performance of the broadband polariser is well maintained up to angles of at least 40 degrees off-axis whereas, as shown in FIGS. 20a to 20c, the performance of the polariser without compensating layers is deteriorating at 20 degrees off-axis and is exceedingly poor by 40 degrees off-axis.

What is claimed is:

1. A broadband cholesteric polariser comprising at least one pair of adjacent layers, wherein the at least one pair of adjacent layers comprises a cholesteric layer and a compensating layer, the compensating layer having a refractive index perpendicular to the compensating layer greater than a refractive index oriented within the compensating layer, and wherein the at least one pair of adjacent layers comprises a plurality of pairs of adjacent layers containing cholesteric layers and compensating layers and each of the cholesteric layers has a different average pitch.

2. A light source comprising at least one light emitter, and a polariser as claimed in claim 1 for polarising light from the at least light emitter.

3. A polariser as claimed in claim 1, wherein the cholesteric layers alternate with the compensating layers.

4. A polariser as claimed in claim 1, wherein each of the cholesteric layers has a substantially constant pitch.

5. A polariser as claimed in claim 4, wherein the pitches of the cholesteric layers increase monotonically from a first surface to a second surface of the polariser.

6. A polariser as claimed in claim 1, wherein each of the cholesteric layers has a graded pitch.

7. A polariser as claimed in claim 6, wherein the average pitches of the cholesteric layers increase monotonically from a first surface to a second surface of the polariser.

8. A polariser as claimed in claim 1, wherein all of the layers are formed in a single film of cholesteric material.

9. A polariser as claimed in claim 8, wherein the compensating layer is in a non-cholesteric state.

10. A polariser as claimed in claim 9, wherein the compensating layer is in a homeotropic state.

11. An optical device comprising a light source and a cholesteric polariser comprising a layer of graded pitch cholesteric material whose pitch increases monotonically from a first surface to a second surface thereof, wherein the first surface is disposed so as to receive light from the light source.

* * * * *